US011698792B2

(12) United States Patent
Guan

(10) Patent No.: US 11,698,792 B2
(45) Date of Patent: Jul. 11, 2023

(54) METHOD FOR STARTING UP DEVICE AND DEVICE

(71) Applicant: Huawei Technologies Co., Ltd., Shenzhen (CN)

(72) Inventor: Xiangshan Guan, Wuhan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 536 days.

(21) Appl. No.: 16/609,105

(22) PCT Filed: Apr. 26, 2017

(86) PCT No.: PCT/CN2017/082067
§ 371 (c)(1),
(2) Date: Oct. 28, 2019

(87) PCT Pub. No.: WO2018/195832
PCT Pub. Date: Nov. 1, 2018

(65) Prior Publication Data
US 2020/0089859 A1  Mar. 19, 2020

(51) Int. Cl.
*G06F 9/44* (2018.01)
*G06F 9/4401* (2018.01)
(Continued)

(52) U.S. Cl.
CPC ............ *G06F 9/4406* (2013.01); *G06F 21/32* (2013.01); *G06V 40/1365* (2022.01); *G06V 40/50* (2022.01)

(58) Field of Classification Search
CPC ... G06F 21/32; G06F 9/4406; G06V 40/1365; G06V 40/13
(Continued)

(56) References Cited

U.S. PATENT DOCUMENTS 9,135,495 B1 * 9/2015 Pope .................. G06V 40/1306
2004/0117637 A1   6/2004 Kanno
(Continued)

FOREIGN PATENT DOCUMENTS

CN   1499421 A    5/2004
CN   101320412 A   12/2008
(Continued)

OTHER PUBLICATIONS

Holz, "Biometric Touch Sensing: Seamlessly Augmenting Each Touch with Continuous Authentication", Nov. 2015, ACM, pp. 2-11 (Year: 2015).*
(Continued)

*Primary Examiner* — Noura Zoubair
*Assistant Examiner* — Gregory A Lane
(74) *Attorney, Agent, or Firm* — Conley Rose, P.C.

(57) ABSTRACT

A device includes a power button and a fingerprint sensor, where the power button is integrated with the fingerprint sensor. A method is applied to a process in which a user presses the power button to start up the device. The method includes obtaining fingerprint information acquired by the fingerprint sensor, and saving the fingerprint information. The method further includes obtaining a fingerprint authentication request. The method further includes providing the fingerprint information to perform fingerprint authentication to log in to an operating system of the device.

20 Claims, 36 Drawing Sheets

(51) Int. Cl.
  *G06F 21/32* (2013.01)
  *G06V 40/12* (2022.01)
  *G06V 40/50* (2022.01)
(58) Field of Classification Search
  USPC .......................................................... 726/19
  See application file for complete search history.

(56) References Cited

U.S. PATENT DOCUMENTS

| | | | |
|---|---|---|---|
| 2015/0127951 | A1 | 5/2015 | Lin |
| 2016/0026841 | A1* | 1/2016 | Merrell ................ G06K 9/0002 382/124 |
| 2016/0086010 | A1 | 3/2016 | Merrell et al. |
| 2016/0314291 | A1 | 10/2016 | De Luna |
| 2017/0060259 | A1 | 3/2017 | Yang et al. |
| 2017/0076079 | A1 | 3/2017 | Ran et al. |
| 2017/0091515 | A1 | 3/2017 | Cao et al. |
| 2018/0005014 | A1* | 1/2018 | Chen ..................... G06K 9/0002 |

FOREIGN PATENT DOCUMENTS

| | | |
|---|---|---|
| CN | 104008319 A | 8/2014 |
| CN | 104573575 A | 4/2015 |
| CN | 104834850 A | 8/2015 |
| CN | 104917894 A | 9/2015 |
| CN | 105117631 A | 12/2015 |
| CN | 105404810 A | 3/2016 |
| CN | 106570373 A | 4/2017 |
| JP | H04348408 A | 12/1992 |
| JP | 2001125660 A | 5/2001 |
| JP | 2012008951 A | 1/2012 |
| JP | 2014153798 A | 8/2014 |
| KR | 20070076317 A | 7/2007 |

OTHER PUBLICATIONS

Machine Translation and Abstract of Chinese Publication No. CN104573575, Apr. 29, 2015, 10 pages.
Machine Translation and Abstract of Chinese Publication No. CN104834850, Aug. 12, 2015, 11 pages.
Machine Translation and Abstract of Chinese Publication No. CN104917894, Sep. 16, 2015, 9 pages.
Machine Translation and Abstract of Chinese Publication No. CN105404810, Mar. 16, 2016, 18 pages.
Machine Translation and Abstract of Chinese Publication No. CN106570373, Apr. 19, 2017, 18 pages.
Foreign Communication From a Counterpart Application, Chinese Application No. 201780008261.X, Chinese Office Action dated Nov. 13, 2019, 10 pages.
Foreign Communication From a Counterpart Application, PCT Application No. PCT/CN2017/082067, English Translation of International Search Report dated Oct. 11, 2017, 2 pages.
Foreign Communication From a Counterpart Application, PCT Application No. PCT/CN2017/082067, English Translation of Written Opinion dated Oct. 11, 2017, 5 pages.

* cited by examiner

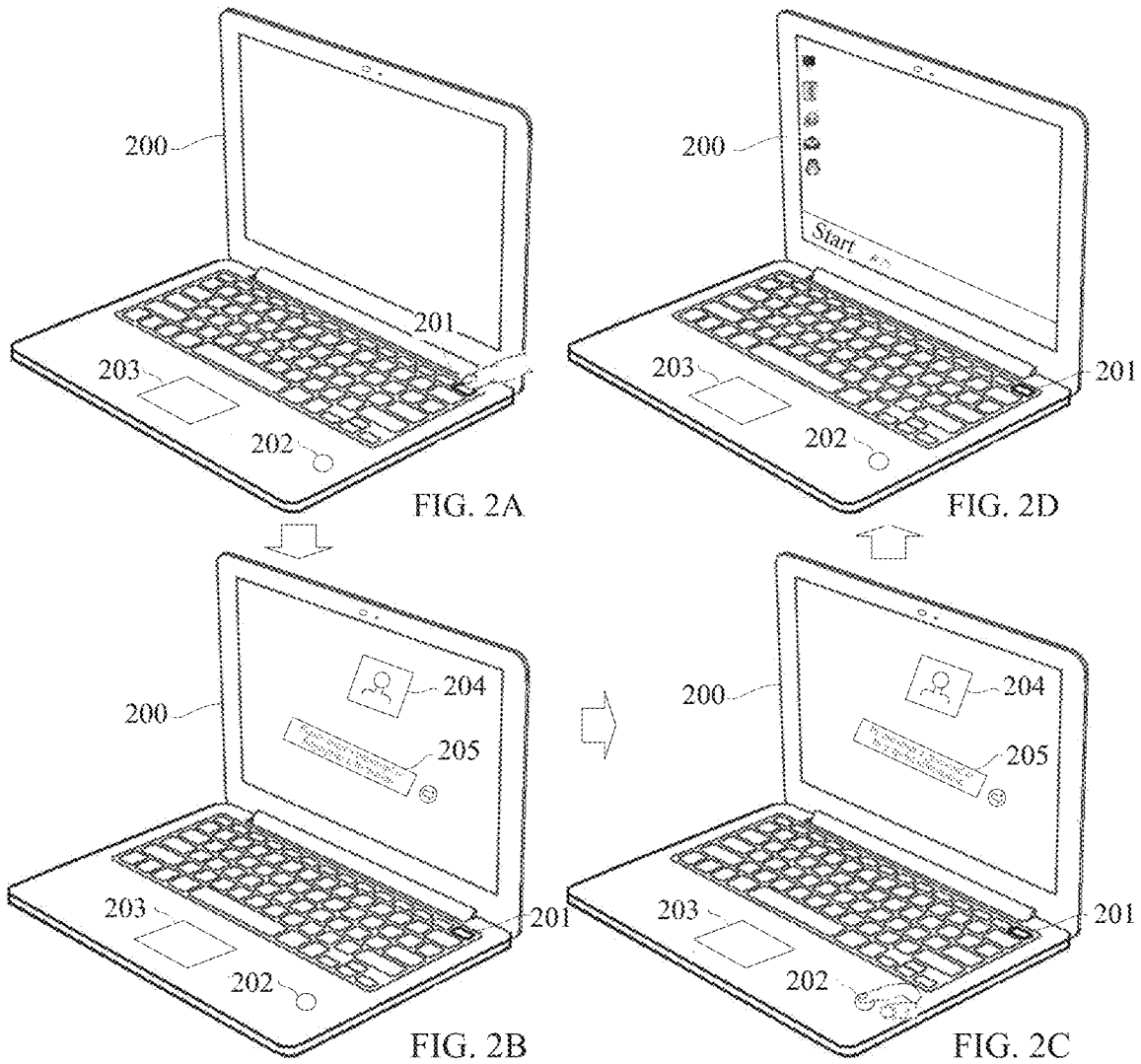

METHOD FOR STARTING UP DEVICE AND DEVICE

CROSS-REFERENCE TO RELATED APPLICATIONS

This application is a National Stage of International Patent Application No. PCT/CN2017/082067 filed on Apr. 26, 2017, which is hereby incorporated by reference in its entireties.

TECHNICAL FIELD

This application relates to the field of electronic technologies, and in particular, to a method for starting up a device and a device.

BACKGROUND

With rapid development of information technologies, terminals (for example, a smartphone, a tablet computer, and a portable computer) are increasingly popular. As a standard technology of a terminal, a fingerprint recognition technology is widely used in aspects such as terminal unlock, device wakeup from screen-off to screen-on, and mobile payment.

However, the fingerprint recognition technology is used only for user identity authentication performed when the terminal is in a startup state or a standby state.

SUMMARY

This application provides a method for starting up a device and a device, so that user identity authentication is performed simultaneously when a device starts up, to log in to an operating system of the device. That is, startup and user identity authentication can be implemented by performing a one-button startup operation by a user. This can reduce user operations and duration that are required for device startup and system login, and improve device startup efficiency and system login efficiency.

To achieve the foregoing objectives, the following technical solutions are used in this application:

According to a first aspect, this application provides a method for starting up a device. The device includes a power button and a fingerprint sensor, the power button is integrated with the fingerprint sensor, the method for starting up a device may be applied to a process in which a user presses the power button to start up the device, and the method for starting up a device may include: obtaining fingerprint information acquired by the fingerprint sensor, and saving the fingerprint information; and obtaining a fingerprint authentication request, and providing the fingerprint information to perform fingerprint authentication, so as to log in to an operating system of the device.

In this application, the power button is integrated with the fingerprint sensor. Therefore, in the process in which the user presses the power button to start up the device, the fingerprint sensor can acquire the fingerprint information of the user when the user touches the power button, and the device can obtain the fingerprint information acquired by the fingerprint sensor and save the fingerprint information. In this way, after the device starts up, the fingerprint information saved in the device can be used to perform user identity authentication, and the user does not need to touch the power button again to enroll the fingerprint information of the user for user identity authentication.

With reference to the first aspect, in a first possible implementation, after the "obtaining fingerprint information acquired by the fingerprint sensor, and saving the fingerprint information", the method in this application may further include: detecting whether the power button is pressed; and deleting the fingerprint information if that the power button is pressed is not detected within first preset duration starting from saving the fingerprint information.

It can be understood that if a normal user wants to start up the device, the user presses the power button of the device within a short period of time (for example, 1 to 3 seconds) that elapses after a finger of the user touches the power button. In this case, if the normal user is to start up the device, the power button is pressed within the short period of time starting from saving the fingerprint information (that is, first preset duration, for example, 1 to 3 seconds). Otherwise, if the power button is not pressed within the short period of time starting from saving the fingerprint information, it indicates that the fingerprint information acquired by the fingerprint sensor may be generated by mistakenly touching the power button by the user. To prevent a malicious user from using the fingerprint information that is acquired by the fingerprint sensor and that is generated by mistakenly touching the power button by the normal user, to perform user identity authentication and steal information saved in the device, the device can delete the fingerprint information if that the power button is pressed is not detected within the first preset duration starting from saving the fingerprint information by the device.

With reference to the first possible implementation of the first aspect, in a second possible implementation, the "detecting whether the power button is pressed" may include: detecting whether a preset general purpose input/output (General Purpose Input Output, GPIO) interface on a mainboard of the device is set to a high level, where when the device is in a sleep mode or a down mode, if the power button is pressed, the preset GPIO interface is set from a low level to the high level.

Correspondingly, the "deleting the fingerprint information if that the power button is pressed is not detected within first preset duration starting from saving the fingerprint information" may include: deleting the fingerprint information if that the preset GPIO interface is set to the high level is not detected within the first preset duration starting from saving the fingerprint information.

With reference to any one of the first aspect or the foregoing possible implementations, in a third possible implementation, a fingerprint authentication request may not be received within second preset duration starting from saving the fingerprint information by the device. In this case, the normal user may leave the device for a period of time because the device cannot log in to an operating system desktop in time. Within the period of time when the normal user leaves, because the device has saved the fingerprint information that can be used to perform user identity authentication, there may be a risk that a malicious user uses the fingerprint information to perform user identity authentication and steal information saved in the device. In this case, to ensure information security of the device, a first MCU can delete the fingerprint information saved by the first MCU. Specifically, after the "obtaining fingerprint information acquired by the fingerprint sensor, and saving the fingerprint information", the method in this application may further include: deleting the fingerprint information if the fingerprint authentication request is not obtained within the second preset duration starting from saving the fingerprint information.

With reference to any one of the first aspect or the foregoing possible implementations, in a fourth possible implementation, the method in this application may further include: deleting the fingerprint information after the fingerprint information is provided to perform fingerprint authentication.

After the device provides the fingerprint information to perform fingerprint authentication, the device further saves the fingerprint information of the user. To prevent a malicious user from using the fingerprint information to perform user identity authentication and steal information saved in the device, the device can delete the fingerprint information after providing the fingerprint information to perform fingerprint authentication, so as to prevent reuse of the fingerprint information.

With reference to any one of the first aspect or the foregoing possible implementations, in a fifth possible implementation, the method in this application may further include: if a login setting of the device indicates that the device does not need to perform fingerprint authentication after startup, deleting the fingerprint information after third preset duration starting from completing loading of a fingerprint drive by the device elapses.

It can be understood that for ease of use, some users may set that the device directly loads an operating system interface without performing user identity authentication after startup. In this case, the fingerprint drive does not need to perform user identity authentication, and the device may delete the fingerprint information after the third preset duration starting from completing loading of the fingerprint drive elapses.

According to a second aspect, this application provides a method for starting up a device. The device includes a power button and a fingerprint sensor, the power button is integrated with the fingerprint sensor, the method for starting up a device may be applied to a process in which a user presses the power button to start up the device, and the method for starting up a device may include: receiving, by a first microcontroller unit (Microcontroller Unit, MCU), a wakeup indication sent by the fingerprint sensor; obtaining, by the first MCU when receiving the wakeup indication, fingerprint information acquired by the fingerprint sensor, and saving the fingerprint information; and receiving, by the first MCU, a fingerprint authentication request sent by a fingerprint drive, and providing the fingerprint information to the fingerprint drive, so that the fingerprint drive performs fingerprint authentication to log in to an operating system of the device.

In this application, the power button is integrated with the fingerprint sensor. Therefore, in the process in which the user presses the power button to start up the device, the fingerprint sensor can acquire the fingerprint information of the user when the user touches the power button, and wake up the first MCU, so that the first MCU obtains and saves the fingerprint information acquired by the fingerprint sensor. In this way, after the device starts up, the fingerprint information saved by the first MCU can be used to perform user identity authentication, and the user does not need to touch the power button again to enroll the fingerprint information of the user for user identity authentication.

With reference to the second aspect, in a first possible implementation, after the "obtaining, by the first MCU when receiving the wakeup indication, fingerprint information acquired by the fingerprint sensor, and saving the fingerprint information", the method in this application may further include: detecting, by the first MCU, whether the power button is pressed; and deleting the fingerprint information if pressed the first MCU does not detect, within first preset duration starting from saving the fingerprint information by the first MCU, that the power button is pressed.

With reference to the first possible implementation of the second aspect, in a second possible implementation, a second MCU may be configured to: detect whether the power button is pressed; and after the second MCU detects that the power button is pressed, set a preset GPIO interface on a mainboard of the device to a high level from a low level. In this case, the first MCU can determine, by detecting whether the preset GPIO interface is set to the high level, whether the power button is pressed. Specifically, the "detecting whether the power button is pressed" may include: detecting, by the first MCU, whether the preset GPIO interface is set to the high level. Correspondingly, the "deleting the fingerprint information if the first MCU does not detect, within first preset duration starting from saving the fingerprint information by the first MCU, that the power button is pressed" may include: deleting the fingerprint information if the first MCU does not detect, within the first preset duration starting from saving the fingerprint information by the first MCU, that the preset GPIO interface is set to the high level.

With reference to any one of the second aspect or the foregoing possible implementations, in a third possible implementation, after the "obtaining, by the first MCU when receiving the wakeup indication, fingerprint information acquired by the fingerprint sensor, and saving the fingerprint information", the method in this application may further include: deleting the fingerprint information if the fingerprint authentication request is not obtained by the first MCU within second preset duration starting from saving the fingerprint information by the first MCU.

With reference to any one of the second aspect or the foregoing possible implementations, in a fourth possible implementation, the method in this application may further include: deleting, by the first MCU, the fingerprint information after providing the fingerprint information to the fingerprint drive.

With reference to any one of the second aspect or the foregoing possible implementations, in a fifth possible implementation, the method in this application may further include: if a login setting of the device indicates that the device does not need to perform user identity authentication after startup, deleting, by the first MCU, the fingerprint information after third preset duration starting from completing loading of a fingerprint drive by the device elapses.

It should be noted that for technical effects of the second aspect and the possible implementations of the second aspect of this application, refer to detailed descriptions in the first aspect and the possible implementations of the first aspect, and details are not described in this application again.

According to a third aspect, this application provides a device. The device includes a power button and a fingerprint sensor, the power button is integrated with the fingerprint sensor, and in a process in which a user presses the power button to start up the device, the device may include an obtaining module, a storage module, and a fingerprint providing module. The obtaining module is configured to obtain fingerprint information acquired by the fingerprint sensor. The storage module is configured to save the fingerprint information obtained by the obtaining module. The fingerprint providing module is configured to: obtain a fingerprint authentication request, and provide the fingerprint information stored by the storage module for fingerprint authentication, so as to log in to an operating system of the device.

With reference to the third aspect, in a first possible implementation, the device may further include a detection module and a deletion module. The detection module is configured to: after the storage module saves the fingerprint information, detect whether the power button is pressed. The deletion module is configured to delete the fingerprint information if the detection module does not detect, within first preset duration starting from saving the fingerprint information by the storage module, that the power button is pressed.

With reference to the first possible implementation of the third aspect, in a second possible implementation, the detection module is specifically configured to: detect whether a preset GPIO interface on a mainboard of the device is set to a high level, where when the device is in a sleep mode or a down mode, if the power button is pressed, the preset GPIO interface is set from a low level to the high level; and the deletion module is specifically configured to delete the fingerprint information if the detection module does not detect, within the first preset duration starting from saving the fingerprint information by the storage module, that the GPIO interface is set to the high level.

With reference to any one of the third aspect or the foregoing possible implementations, in a third possible implementation, the deletion module is configured to: after the storage module saves the fingerprint information, delete the fingerprint information if the fingerprint providing module does not obtain the fingerprint authentication request within second preset duration starting from saving the fingerprint information by the storage module.

With reference to any one of the third aspect or the foregoing possible implementations, in a fourth possible implementation, the deletion module is configured to delete the fingerprint information after the fingerprint providing module provides the fingerprint information to perform fingerprint authentication.

With reference to any one of the third aspect or the foregoing possible implementations, in a fifth possible implementation, the deletion module is configured to: if a login setting of the device indicates that the device does not need to perform user identity authentication after startup, delete the fingerprint information after third preset duration starting from completing loading of a fingerprint drive by the device elapses.

According to a fourth aspect, this application provides a device. The device includes a power button, a fingerprint sensor, a memory, a processor, and a display, and the power button is integrated with the fingerprint sensor. The power button, the fingerprint sensor, the memory, the display, and the processor are connected by using a bus, the fingerprint sensor is configured to acquire fingerprint information of a user, the memory is configured to store computer program code, the computer program code includes an instruction, and when the processor executes the instruction, the device performs the method for starting up a device according to any one of the first aspect and the possible implementations of the first aspect of this application.

Specifically, the processor is configured to obtain the fingerprint information acquired by the fingerprint sensor; the memory is configured to save the fingerprint information obtained by the processor; the processor is further configured to: obtain a fingerprint authentication request, and provide fingerprint information to perform fingerprint authentication, so as to log in to an operating system of the device.

With reference to the fourth aspect, in a first possible implementation, the processor is further configured to: after the memory saves the fingerprint information, detect whether the power button is pressed; and delete the fingerprint information if that the power button is pressed is not detected within first preset duration starting from saving the fingerprint information.

With reference to the first possible implementation of the fourth aspect, in a second possible implementation, the processor is specifically configured to detect whether a preset GPIO interface on a mainboard of the device is set to a high level, where when the device is in a sleep mode or a down mode, if the power button is pressed, the preset GPIO interface is set from a low level to the high level.

With reference to any one of the fourth aspect or the foregoing possible implementations, in a third possible implementation, the processor is further configured to: after the memory saves the fingerprint information, delete the fingerprint information if the fingerprint authentication request is not obtained within second preset duration starting from saving the fingerprint information.

With reference to any one of the fourth aspect or the foregoing possible implementations, in a fourth possible implementation, the processor is further configured to delete the fingerprint information after the fingerprint information is provided to perform fingerprint authentication.

With reference to any one of the fourth aspect or the foregoing possible implementations, in a fifth possible implementation, the processor is configured to: if a login setting of the device indicates that the device does not need to perform user identity authentication after startup, delete the fingerprint information after third preset duration starting from completing loading of a fingerprint drive by the device elapses.

According to a fifth aspect, this application provides a computer storage medium. The computer storage medium includes a computer instruction, and when run on a device, the computer instruction enables the device to perform the method for starting up a device according to any one of the first aspect and the possible implementations of the first aspect of this application.

According to a sixth aspect, this application provides a computer program product. Running of the computer program product on a computer causes the computer to perform the method for starting up a device according to any one of the first aspect and the possible implementations of the first aspect of this application.

It can be understood that the device described in the third aspect, the device described in the fourth aspect, the computer storage medium described in the fifth aspect, and the computer program product described in the sixth aspect all are configured to perform the method for starting up a device provided in any one of the first aspect and the possible implementations of the first aspect. Therefore, for beneficial effects that can be achieved by the device, the computer storage medium, and the computer program product, refer to beneficial effects of the method for starting up a device provided in any one of the first aspect and the possible implementations of the first aspect, and details are not described herein again.

According to a seventh aspect, this application provides an MCU. The MCU is a first MCU, the first MCU is included in a device, the device includes a power button and a fingerprint sensor, the power button is integrated with the fingerprint sensor, and in a process in which a user presses the power button to start up the device, the first MCU includes a receiving module, an obtaining module, a storage module, and a fingerprint providing module. The receiving module is configured to receive a wakeup indication sent by the fingerprint sensor. The obtaining module is configured to: when the wakeup indication is received, obtain fingerprint information acquired by the fingerprint sensor. The storage module is configured to save the fingerprint information obtained by the obtaining module. The receiving module is further configured to receive a fingerprint authentication request sent by a fingerprint drive. The fingerprint providing module is configured to: after the receiving module receives the fingerprint authentication request, provide, to the fingerprint drive, the fingerprint information stored by the storage module, so that the fingerprint drive performs fingerprint authentication to log in to an operating system of the device.

With reference to the seventh aspect, in a first possible implementation, the MCU may further include a detection module and a deletion module. The detection module is configured to: after the storage module saves the fingerprint information, detect whether the power button is pressed. The deletion module is configured to delete the fingerprint information if the detection module does not detect, within first preset duration starting from saving the fingerprint information by the storage module, that the power button is pressed.

With reference to the first possible implementation of the seventh aspect, in a second possible implementation, the detection module is specifically configured to detect whether a preset general purpose input/output GPIO interface on a mainboard of the device is set to a high level; and the deletion module is specifically configured to delete the fingerprint information if the detection module does not detect, within the first preset duration starting from saving the fingerprint information by the storage module, that the preset GPIO interface is set to the high level, where when the device is in a sleep mode or a down mode, if a second MCU detects that the power button is pressed, the preset GPIO interface is set by the second MCU from a low level to the high level.

With reference to any one of the seventh aspect or the possible implementations, in a third possible implementation, the MCU further includes a deletion module. The deletion module is configured to: after the storage module saves the fingerprint information, delete the fingerprint information if the fingerprint authentication request is not obtained by the receiving module within second preset duration starting from saving the fingerprint information by the storage module.

With reference to any one of the seventh aspect or the foregoing possible implementations, in a fourth possible implementation, the deletion module is configured to delete the fingerprint information after the fingerprint providing module provides the fingerprint information to the fingerprint drive.

With reference to any one of the seventh aspect or the foregoing possible implementations, in a fifth possible implementation, the deletion module is configured to: if a login setting of the device indicates that the device does not need to perform user identity authentication after startup, delete the fingerprint information after third preset duration starting from completing loading of the fingerprint drive by the device elapses.

According to an eighth aspect, this application provides a device. The device includes a power button, a fingerprint sensor, a memory, a processor, and a display, and the power button is integrated with the fingerprint sensor, and the processor is the foregoing first MCU; the power button, the fingerprint sensor, the memory, the display, and the processor are connected by using a bus, the fingerprint sensor is configured to acquire fingerprint information of a user, the memory is configured to store computer program code, the computer program code includes an instruction, and when the processor executes the instruction, the device performs the method for starting up a device according to the second aspect.

With reference to the eighth aspect, in a first possible implementation, the processor is further configured to: after the memory saves the fingerprint information, detect whether the power button is pressed; and delete the fingerprint information if that the power button is pressed is not detected within first preset duration starting from saving the fingerprint information by the memory.

With reference to the first possible implementation of the eighth aspect, in a second possible implementation, the processor is specifically configured to detect whether a preset GPIO interface on a mainboard of the device is set to a high level, where when the device is in a sleep mode or a down mode, if a second MCU detects that the power button is pressed, the preset GPIO interface is set by the second MCU from a low level to the high level.

With reference to any one of the eighth aspect or the foregoing possible implementations, in a third possible implementation, the processor is further configured to: after the memory saves the fingerprint information, delete the fingerprint information if the fingerprint authentication request is not obtained within second preset duration starting from saving the fingerprint information by the memory.

With reference to any one of the eighth aspect or the foregoing possible implementations, in a third possible implementation, the processor is further configured to delete the fingerprint information after providing the fingerprint information to the fingerprint drive.

With reference to any one of the eighth aspect or the foregoing possible implementations, in a third possible implementation, the processor is further configured to: if a login setting of the device indicates that the device does not need to perform user identity authentication after startup, delete the fingerprint information after third preset duration starting from completing loading of the fingerprint drive by the device elapses.

According to a ninth aspect, this application provides a computer storage medium. The computer storage medium includes a computer instruction, and when run on a device, the computer instruction enables the device to perform the method for starring up a device according to any one of the second aspect and the possible implementations of the second aspect.

According to a tenth aspect, this application provides a computer program product. Running of the computer program product on a computer causes the computer to perform the method for starting up a device according to any one of the second aspect and the possible implementations of the second aspect.

It can be understood that the MCU described in the seventh aspect, the device described in the eighth aspect, the computer storage medium described in the ninth aspect, and the computer program product described in the tenth aspect all are configured to perform the method for starting up a device provided in any one of the second aspect and the possible implementations of the second aspect. Therefore, for beneficial effects that can be achieved by the MCU, the device, the computer storage medium, and the computer program product, refer to beneficial effects of the method for starting up a device provided in any one of the second aspect and the possible implementations of the second aspect, and details are not described herein again.

BRIEF DESCRIPTION OF DRAWINGS

FIG. 2A, FIG. 2B, FIG. 2C and FIG. 2D are a schematic diagram of a display interface of a notebook computer in the prior art;

DESCRIPTION OF EMBODIMENTS

In the specification and accompanying drawings of this application, terms "first", "second", and so on are intended to distinguish between different objects or different processing on a same object, but are not intended to indicate a specific order of an object. For example, a first MCU and a second MCU are different MCUs, and first preset duration and second preset duration may be different time periods or duration.

A method for starting up a device provided in this application may be applied to a process of starting up a device and logging in to an operating system after the device starts up. According to the method for starting up a device, user identity authentication may be performed simultaneously when the device starts up, to log in to the operating system of the device.

The device in this application includes a power button and a fingerprint sensor (Sensor), the power button is integrated with the fingerprint sensor, and the fingerprint sensor is configured to acquire fingerprint information of a user.

For example, fingerprint sensors in this application may be classified into an optical fingerprint sensor, a semiconductor capacitance sensor, a semiconductor thermosensitive sensor, a semiconductor pressure-sensitive sensor, an ultrasonic sensor, a radio frequency RF sensor, or the like according to a sensing principle (that is, a fingerprint imaging principle and technology). This is not limited in this application.

Figure 1A:
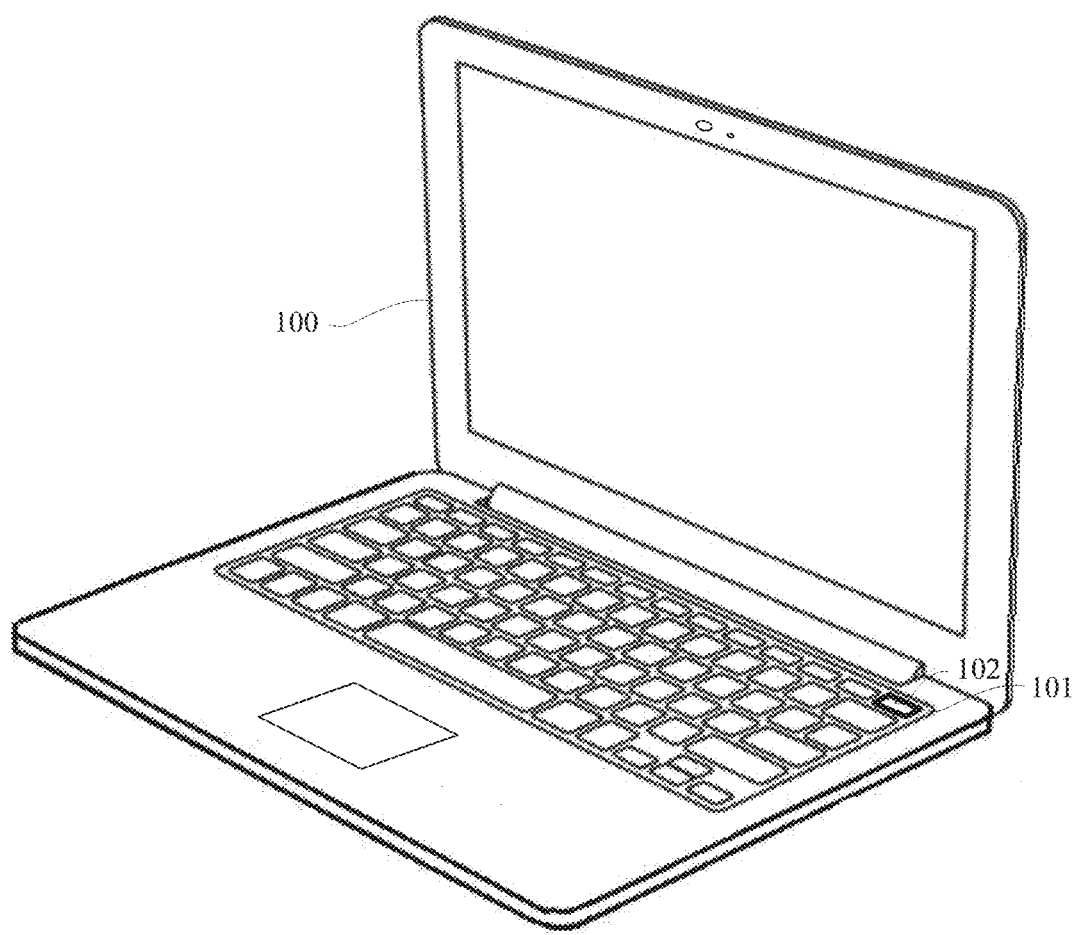
FIG. 1A and FIG. 1B are a schematic structural diagram of a notebook computer according to this application.
Figure 3A:
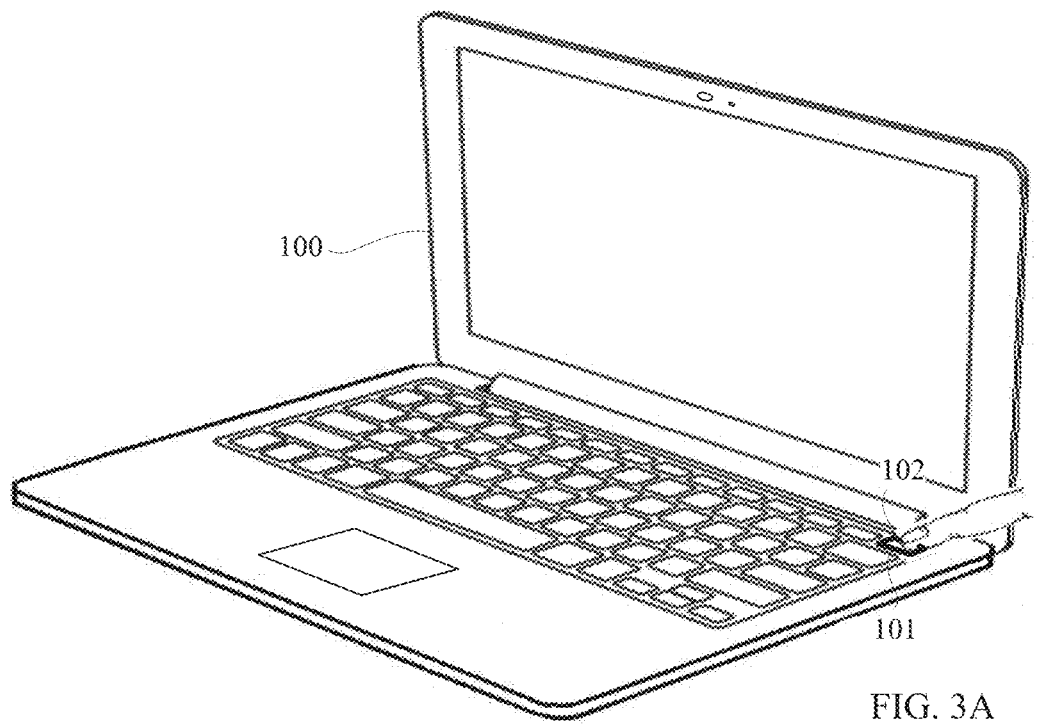
FIG. 3A, FIG. 3B are schematic diagram 1 of a display interface of a notebook computer according to this application.
Figure 3B:
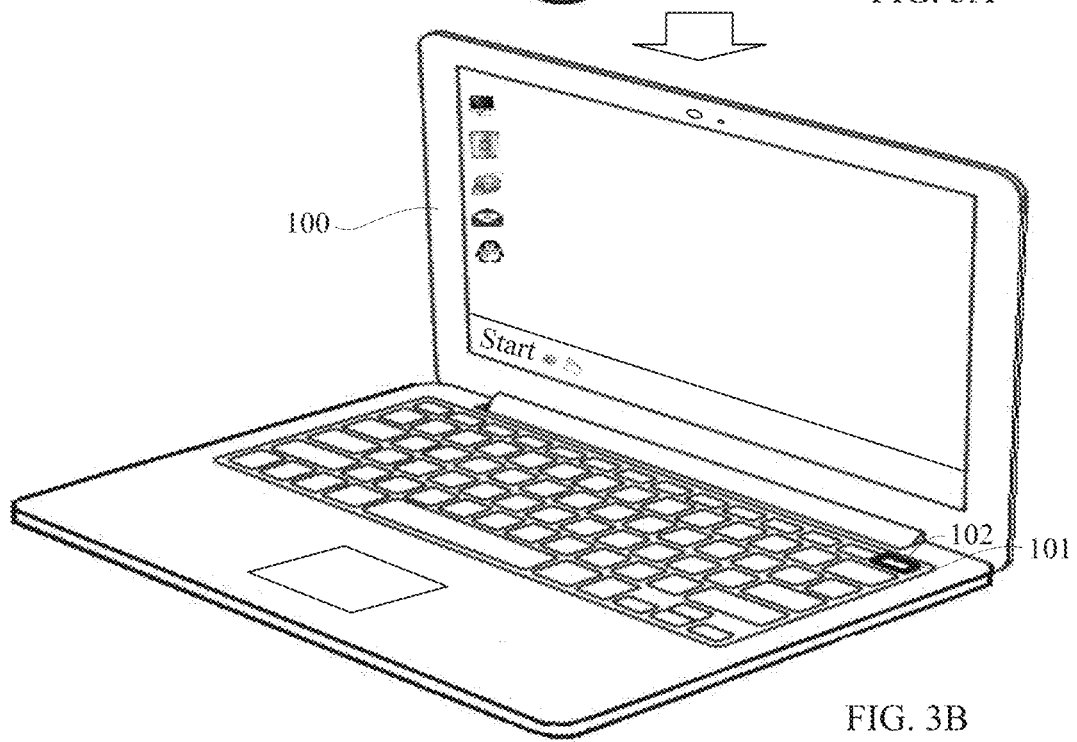

For example, the device in this application may be a portable computer example, a notebook computer 100 shown in FIG. 1A or FIG. 3A, FIG. 3B), a mobile phone, a personal computer (Personal Computer, PC), a wearable electronic device (for example, a smartwatch), a tablet computer, or the like. No special limitation is imposed on a specific form of the device in the following embodiments.

The fingerprint sensor may be integrated onto one or more surfaces, touchable by a user's finger, of the power button. For example, in this application, the device provided in this application is described by using an example in which the device is the notebook computer 100 shown in FIG. 1A.

Figure 1B:
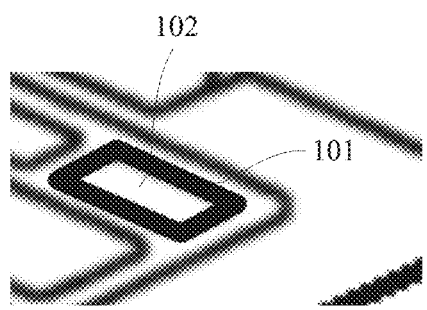

As shown in FIG. 1A, the notebook computer 100 includes a power button 101 and a fingerprint sensor 102. The power button 101 is integrated with the fingerprint sensor 102. FIG. 1B is a locally enlarged diagram of the power button 101 of the notebook computer 100 shown in FIG. 1A. As shown in FIG. 1B, the fingerprint sensor 102 may be integrated onto an upper surface of the power button 101.

To distinguish between the device provided in this application and a prior-art device, brief descriptions are provided in this application for a startup and system login process of the notebook computer 100 shown in FIG. 1A and a startup and system login process of a prior-art notebook computer (for example, a notebook computer 200 shown in FIG. 2A, FIG. 2B, FIG. 2C and FIG. 2D).

As shown in FIG. 2A, FIG. 2B, FIG. 2C and FIG. 2D, the prior-art notebook computer 200 also includes a power button 201 and a fingerprint sensor 202, but the power button 201 and the fingerprint sensor 202 are usually disposed separately, or the fingerprint sensor 202 may be further integrated onto a touch module 203 of the notebook computer 200.

As shown in FIG. 2A, when a user presses the power button 201 of the notebook computer 200, the notebook computer 201 may respond to the press operation performed by the user on the power button 201, start up, and display a system login interface that is shown in FIG. 2B and that includes a user account icon 204 and a user password input box 205, for the user to enter a user password or for the user to enroll user fingerprint information by using the fingerprint sensor 202, so as to log in to an operating system of the notebook computer 200.

As shown in FIG. 2C, when a user touches the fingerprint sensor 202 of the notebook computer 200, the fingerprint sensor 202 can acquire fingerprint information of the user, to perform user identity authentication and log in to the operating system of the notebook computer 200; and a system desktop shown in FIG. 2D is displayed after user identity authentication succeeds.

It can be understood that in a startup and system login process of the notebook computer 200 shown in FIG. 2A, FIG. 2B, FIG. 2C and FIG. 2D, the user needs to start up the notebook computer 200 by pressing a button once and then enroll the fingerprint information by using the fingerprint sensor 202, to perform user identity authentication and log in to the operating system of the notebook computer 200.

FIG. 3A, FIG. 3B are a schematic diagram of a startup system login process example of the notebook computer 100 shown in FIG. 1A.

A user may press the power button 101 of the notebook computer 100 to control startup of the notebook computer 100. Therefore, as shown in FIG. 3A, when the user presses the power button 101 of the notebook computer 100, a finger of the user definitely touches the power button 101. When the finger of the user touches the power button 101, the fingerprint sensor 102 integrated onto the power button 101 may acquire fingerprint information of the user touching the power button 101.

Therefore, the notebook computer 100 can be started up in response to the press operation performed by the user on the power button 101, and directly perform user identity authentication by using the fingerprint information acquired by the fingerprint sensor 102, to log in to the operating system of the notebook computer 100; and after user identity authentication succeeds, display a system desktop shown in FIG. 3B.

It can be understood that in a startup and system login process of the notebook computer 100 shown in FIG. 3A, FIG. 3B, startup of the notebook computer 100 and user identity authentication can be implemented through a one-button startup operation of the user, that is, user identity authentication can be performed simultaneously when the notebook computer 100 starts up, to log in to the operating system of the notebook computer 100. This can reduce duration required for startup and system login of the notebook computer 100 and improve startup efficiency of the notebook computer 100 and system login efficiency.

All methods in the following embodiments may be implemented by the notebook computer 100.

Figure 4:
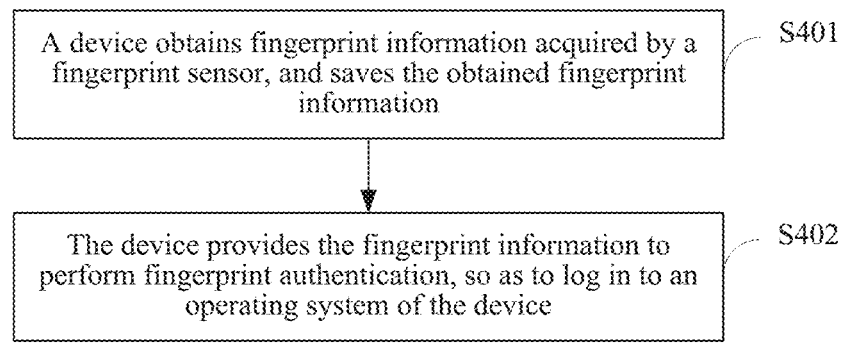
FIG. 4 is flowchart 1 of a method for starting up a device according to this application.

This application provides a method for starting up a device. The device may include a power button and a fingerprint sensor, the power button is integrated with the fingerprint sensor, and the method for starting up a device may be applied to a process in which a user presses the power button to start up the device. As shown in FIG. 4, the method for starting up a device may include S401 and S402.

S401. The device obtains fingerprint information acquired by the fingerprint sensor, and saves the obtained fingerprint information.

In the process in which the user presses the power button to start up the device, a finger of the user can touch the power button. When the finger of the user touches the power button, the fingerprint sensor integrated with the power button can acquire the fingerprint information of the user.

The device can obtain the fingerprint information acquired by the fingerprint sensor, and then save the fingerprint information, so that when a user presses the power button to control the device to start up, fingerprint authentication, that is, user identity authentication, can be performed by using the fingerprint information, so as to log in to an operating system. The device can encrypt the fingerprint information and temporarily save the encrypted fingerprint information, so that the fingerprint information can be provided to perform fingerprint authentication, so as to log in to the operating system of the device.

S402. The device provides the fingerprint information to perform fingerprint authentication, so as to log in to an operating system of the device.

When detecting that the power button is pressed, the device can trigger power-on of a central processing unit (Central Processing Unit, CPU) of the device, wake up the operating system of the device, then load a fingerprint drive, and then provide the fingerprint information to the fingerprint drive, and the fingerprint drive uses the fingerprint information to perform fingerprint authentication, so as to log in to the operating system.

Alternatively, when detecting that the power button is pressed, the device can obtain a fingerprint authentication request sent by the fingerprint drive. After obtaining the fingerprint authentication request, the device can provide the fingerprint information to perform fingerprint authentication, so as to log in to the operating system. The fingerprint drive in this application may be used as a component of the operating system.

According to the method for starting up a device provided in this application, the power button is integrated with the fingerprint sensor. Therefore, in the process in which the user presses the power button to start up the device, the fingerprint sensor can acquire the fingerprint information of the user when the user touches the power button, and the device can obtain the fingerprint information acquired by the fingerprint sensor and save the fingerprint information. In this way, after the device starts up, the fingerprint information saved in the device can be used to perform user identity authentication, and the user does not need to touch the power button again to enroll the fingerprint information of the user for user identity authentication.

In a first application scenario of this embodiment of the present invention, descriptions are provided for a startup and system login process performed when a device (for example, a notebook computer 100) is powered on for the first time.

Figure 5A:
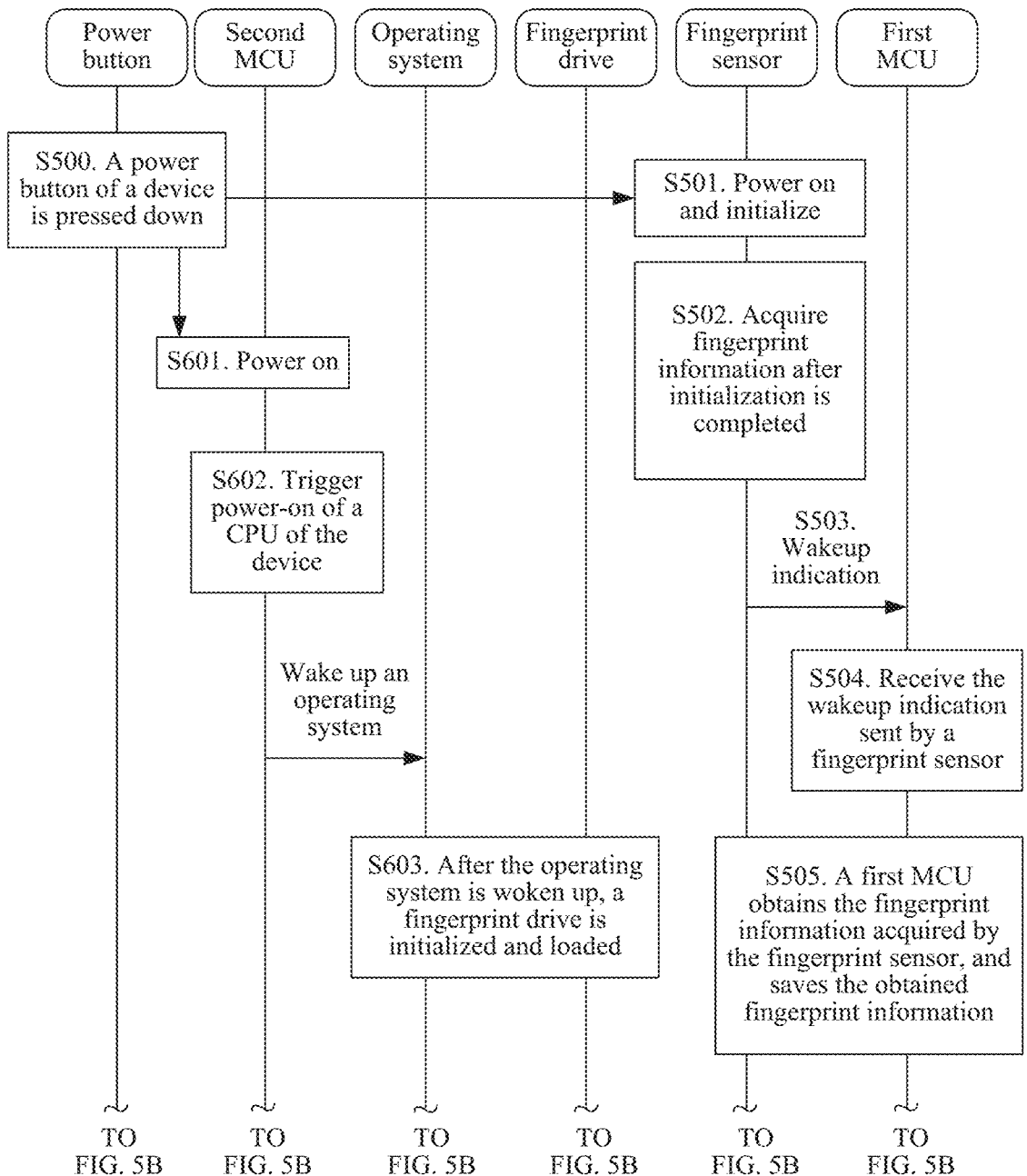
FIG. 5A and FIG. 5B are flowchart 2 of a method for starting up a device according to this application.
Figure 5B:
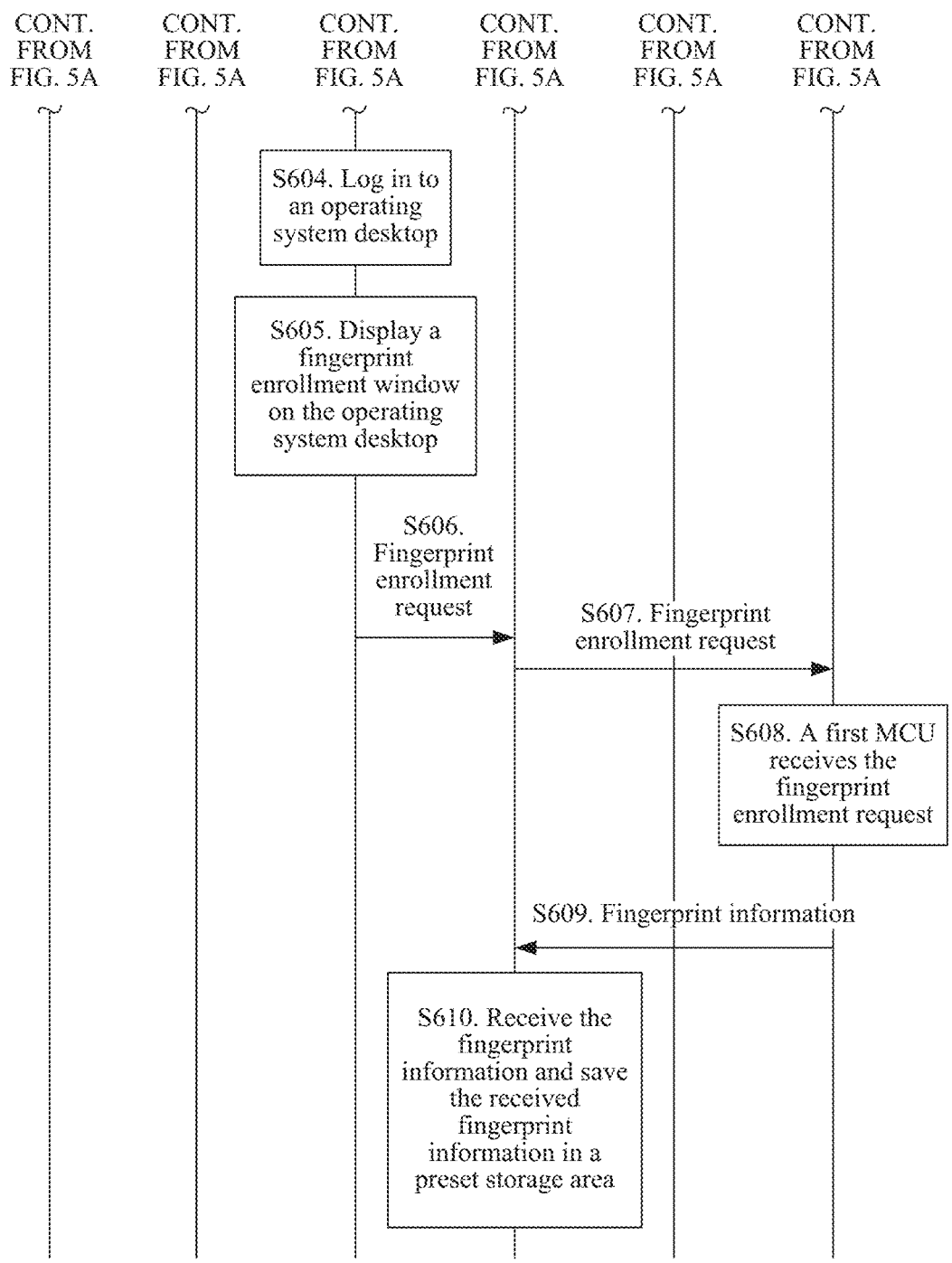

Before delivery of the notebook computer 100, all components (including a fingerprint sensor 102) of the notebook computer 100 are in a power-off state. After delivery of the notebook computer 100, when a user uses the notebook computer 100 for the first time, the user can press a power button 101 of the notebook computer 100 to control the notebook computer 100 to be powered on for the first time, so as to start up the notebook computer 100. In addition, after the user presses the power button, the fingerprint sensor 102 integrated with the power button 101 can be powered on, and can acquire fingerprint information of the user that touches the power button 101, so that after the notebook computer 100 starts up, the fingerprint information acquired by the fingerprint sensor 102 can be used to perform user identity authentication, so as to log in to an operating system of the notebook computer 100. Specifically, as shown in FIG. 5A and FIG. 5B, a method for starting up a device provided in this application may include the following steps.

S500. A power button of a device is pressed.

When the power button of the device is pressed, power-on and initialization of a fingerprint sensor integrated onto the power button can be triggered, and after initialization is completed, fingerprint information of a user starts to be acquired, that is, S501 and a subsequent method procedure thereof are performed. In addition, when the power button of the device is pressed, power-on of a second MCU can be further triggered. The second MCU triggers power-on of a CPU of the device and wakes up the operating system of the device, that is, S601 and a subsequent method procedure are performed.

S501. A fingerprint sensor integrated onto the power button of the device is powered on and initialized.

After completing initialization, the fingerprint sensor can acquire the fingerprint information of the user that touches the power button.

S502. The fingerprint sensor acquires fingerprint information of a user.

When the user presses the power button of the device, a finger of the user touches the power button. In this case, the fingerprint sensor integrated with the power button can detect that the user is touching the fingerprint sensor, and acquire the fingerprint information of the user.

For example, as shown in FIG. 3A, when the user presses the power button 101 of the notebook computer 100, the finger of the user definitely touches the power button 101. In this case, the fingerprint sensor 102 can acquire the fingerprint information of the user that touches the power button 101.

It can be understood that in the first application scenario, if the user mistakenly touches the power button of the device, but the power button is not pressed, the fingerprint information of the user cannot be acquired, because the fingerprint sensor is not powered on. The fingerprint information in this application may be a fingerprint image.

S503. The fingerprint sensor sends a wakeup indication to a first MCU.

If the fingerprint sensor acquires the fingerprint information of the user, it indicates that the user may need to start up the device. In this case, the fingerprint sensor can wake up the first MCU, so that the first MCU can start working.

S504. The first MCU receives the wakeup indication sent by the fingerprint sensor.

S505. The first MCU obtains the fingerprint information acquired by the fingerprint sensor, and saves the obtained fingerprint information.

After receiving the wakeup indication sent by the fingerprint sensor, the first MCU can enter a working state and can obtain the fingerprint information acquired by the fingerprint sensor, so that when a fingerprint enrollment request or a fingerprint authentication request sent by the fingerprint drive is received, the first MCU can send the fingerprint information to the fingerprint drive, so as to perform user identity authentication.

S601. The second MCU is powered on.

The second MCU in this application may be system firmware MCU of the device. The second MCU may be configured to: trigger power-on of a CPU of the device after the power button is pressed, and wake up the operating system of the device. The system firmware of the device may include a basic input/output system (Basic input Output System, BIOS)/an embedded controller (Embed Controller, EC) of the device.

S602. The second MCU triggers power-on of a CPU of the device, and wakes up an operating system of the device.

S603. After the operating system of the device is woken up, a fingerprint drive of the device is initialized and loaded.

Usually, when the device starts up for the first time after delivery, it is possible that no login password (for example, user fingerprint information) of the operating system is entered on the device. Therefore, after the operating system is woken up, a system desktop may be directly logged in to. That is, after S603, the method in this application may further include S604:

S604. The operating system logs in to an operating system desktop.

Figures 6A, 6B:
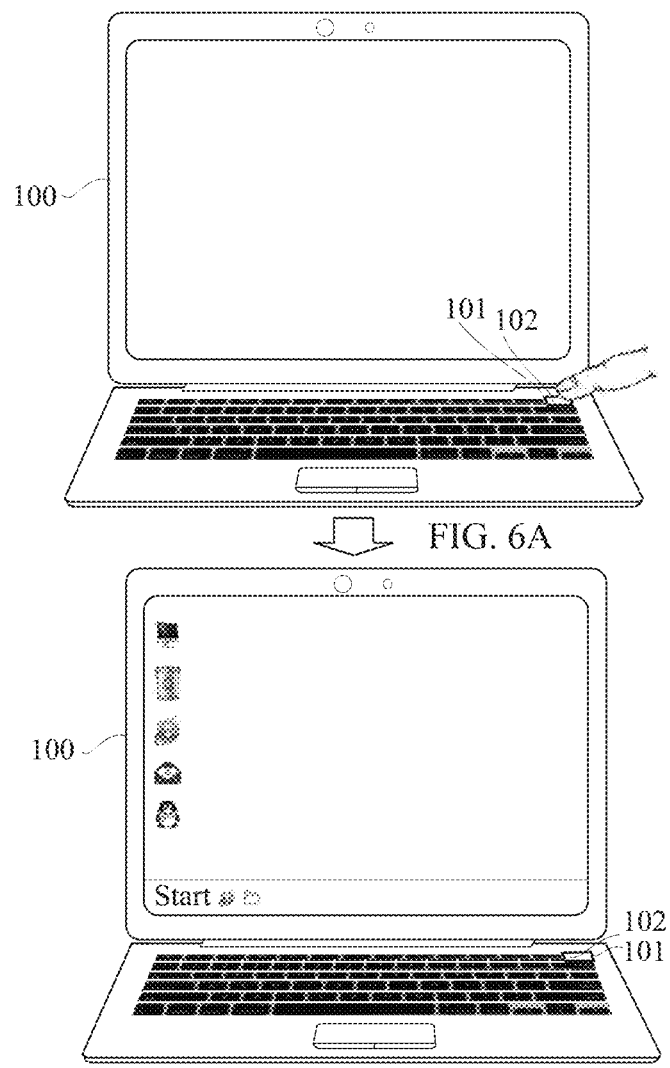
FIG. 6A and FIG. 6B are schematic diagram 2 of a display interface of a device according to this application.

For example, as shown in FIG. 6A, when a user presses the power button 101 of the notebook computer 100 (that is, performs S500), the notebook computer 100 may respond to the press operation performed by the user on the power button 101, and start up. This is the first time the notebook computer 100 starts up after delivery of the notebook computer 100, and no login password (for example, user fingerprint information) for entering the operating system is entered on the notebook computer 100. Therefore, after the CPU is powered on and the operating system of the device is woken up, an operating system desktop shown in FIG. 6B can be directly displayed.

Further, to improve information security during use of a device and reduce a possibility of revealing information saved in the device, after loading a system desktop, the device may further display, on the system desktop, a prompt window used to instruct the user to enroll fingerprint information. For example, after system desktop login, the device can display, on the system desktop, a "one-button login" fingerprint enrollment window 601 shown in FIG. 7A. Specifically, after S604, the method in this application may further include S605:

S605. The operating system displays a fingerprint enrollment window on the operating system desktop.

Figure 7A:
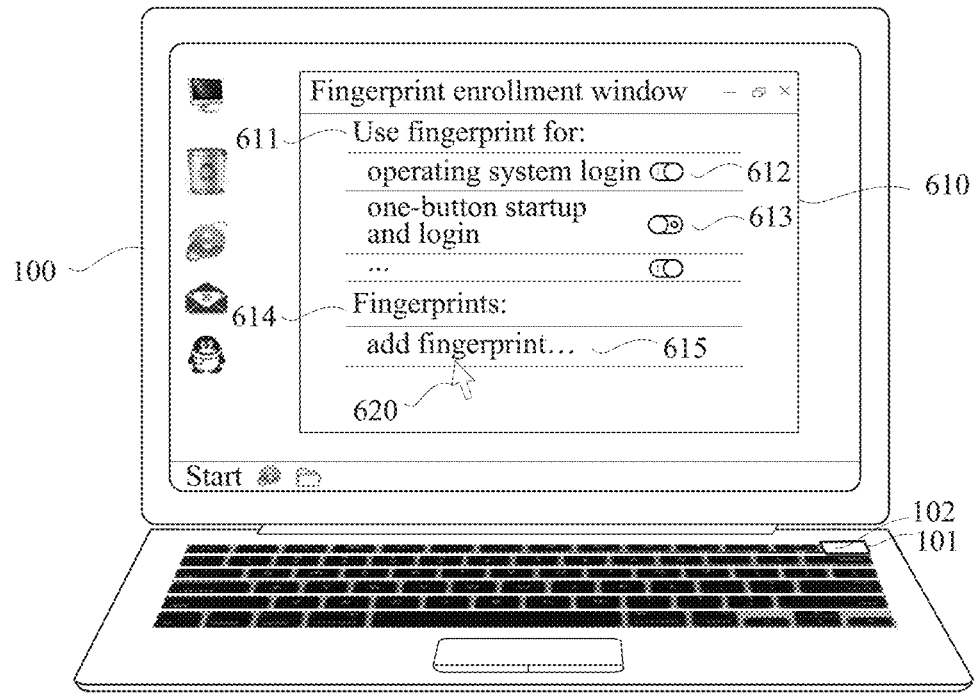
FIG. 7A and FIG. 7B are schematic diagram 3 of a display interface of a device according to this application.

For example, after the operating system desktop shown in FIG. 6B is displayed a period of time, the notebook computer 100 may display, on the operating system desktop, the fingerprint enrollment window 610 shown in FIG. 7A. As shown in FIG. 7A, the fingerprint enrollment window 610 may include a "fingerprint function list" 611 and a "fingerprint list" 614. The "fingerprint function list" 611 may include at least one fingerprint use option and an option switch thereof. For example, the "fingerprint function list" 611 may include an "operating system login" option and an option switch 612 thereof and a "one-button startup and login" option and an option switch 613 thereof. The "fingerprint list" 614 may include an "add fingerprint" option 615.

The user may turn on the option switch of the corresponding fingerprint use option in the "fingerprint function list" 611 to specify use of subsequently added fingerprint information. For example, as shown in FIG. 7A, the option switch 613 of the "one-button startup and login" option in the "fingerprint function list" 611 is in an on state, and other option switches in another "fingerprint function list" 611 are in an off state. Therefore, as shown in FIG. 7A, when the user controls a cursor 620 to move to the "add fingerprint" option 615, clicks the "add fingerprint" option 615, and performs a subsequent fingerprint enrollment operation, the enrolled fingerprint information can be used to perform "one-button startup and login" of the notebook computer 100.

S606. The operating system sends a fingerprint enrollment request to the fingerprint drive in response to an input command of the user on the fingerprint enrollment window.

The fingerprint enrollment request is used to instruct the fingerprint drive to obtain the fingerprint information acquired by the fingerprint sensor.

S607. After receiving the fingerprint enrollment request, the fingerprint drive sends the fingerprint enrollment request to the first MCU.

It can be understood that as described in S501 to S505, after being initialized and powered on, the fingerprint sensor can acquire the fingerprint information of the user that touches the power button and wake up the first MCU, and the first MCU obtains and saves the fingerprint information acquired by the fingerprint sensor. Therefore, the fingerprint drive can send the fingerprint drive to the first MCU, to obtain, from the first MCU, the fingerprint information acquired by the fingerprint sensor.

S608. The first MCU receives the fingerprint enrollment request sent by the fingerprint drive.

S609. The first MCU sends, to the fingerprint drive, the fingerprint information saved by the first MCU.

S610. The fingerprint drive receives the fingerprint information and saves the received fingerprint information in a preset storage area.

Figure 7B:
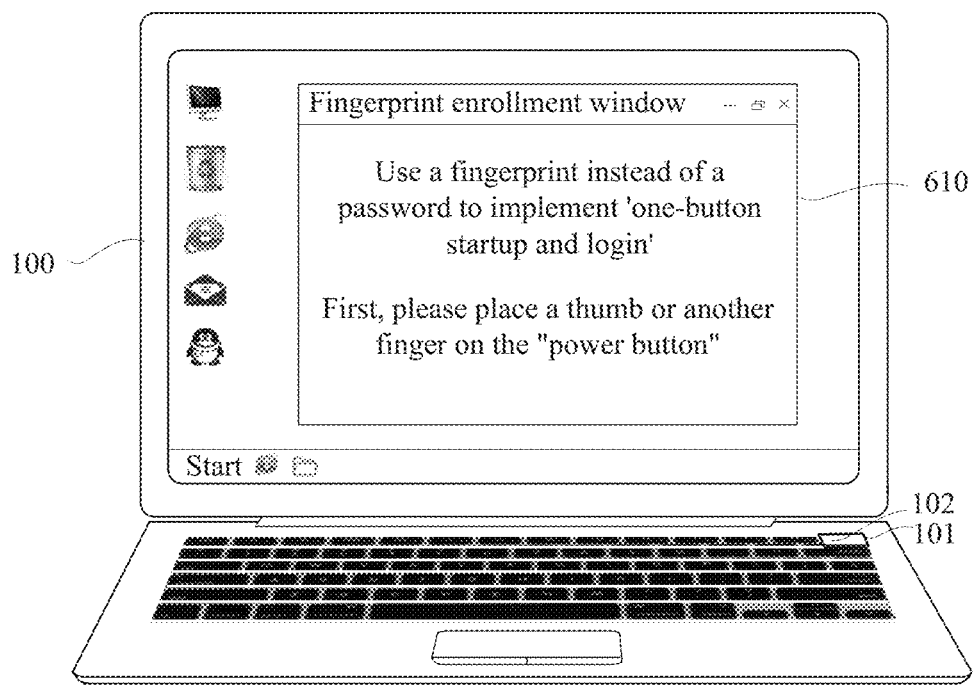
Figure 8A:
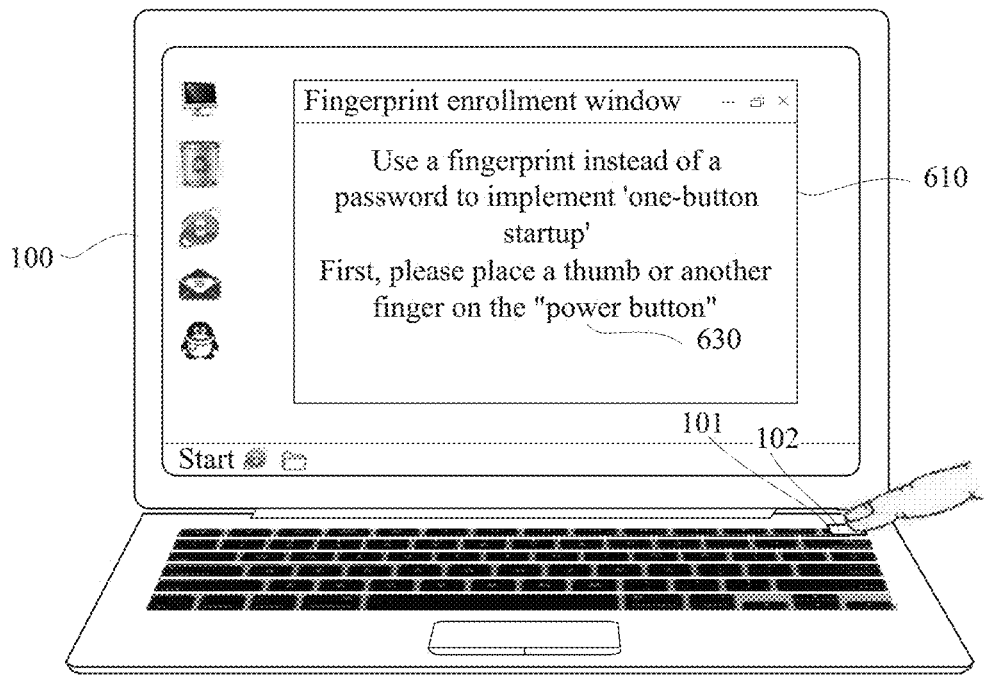
FIG. 8A and FIG. 8B are schematic diagram 4 of a display interface of a device according to this application.

For example, as shown in FIG. 7A, after the user controls the cursor 620 to move to the "add fingerprint" option 615 and clicks the "add fingerprint" option 615, the operating system can send a fingerprint enrollment request to the fingerprint drive (that is, perform S606), and first prompt information 630 is displayed in the fingerprint enrollment window 610 shown in FIG. 7B. For example, the first prompt information 630 may be prompt characters including "Use a fingerprint instead of a password to implement 'one-button startup and login'" and "First, please place a thumb or another finger on the 'power button'". Then as shown in FIG. 8A, after a finger of a user touches the "power button" 101, the fingerprint sensor 102 can acquire fingerprint information of the user, and the first MCU can also obtain and save the fingerprint information acquired by the fingerprint sensor 102, that is, perform S502 to S505. In addition, after receiving the fingerprint enrollment request, the fingerprint drive can obtain, from the first MCU, the fingerprint information acquired by the fingerprint sensor 102 (that is, perform S606 to S609).

It can be understood that in the foregoing fingerprint enrollment process, the first MCU may not save the fingerprint information, but after receiving the fingerprint enrollment request sent by the fingerprint drive, obtains the fingerprint information acquired by the fingerprint sensor and directly sends the obtained fingerprint information to the fingerprint drive. That is, in the fingerprint enrollment process, S505 may be replaced by S505'.

S505'. The first MCU obtains the fingerprint information acquired by the fingerprint sensor.

Figure 8B:
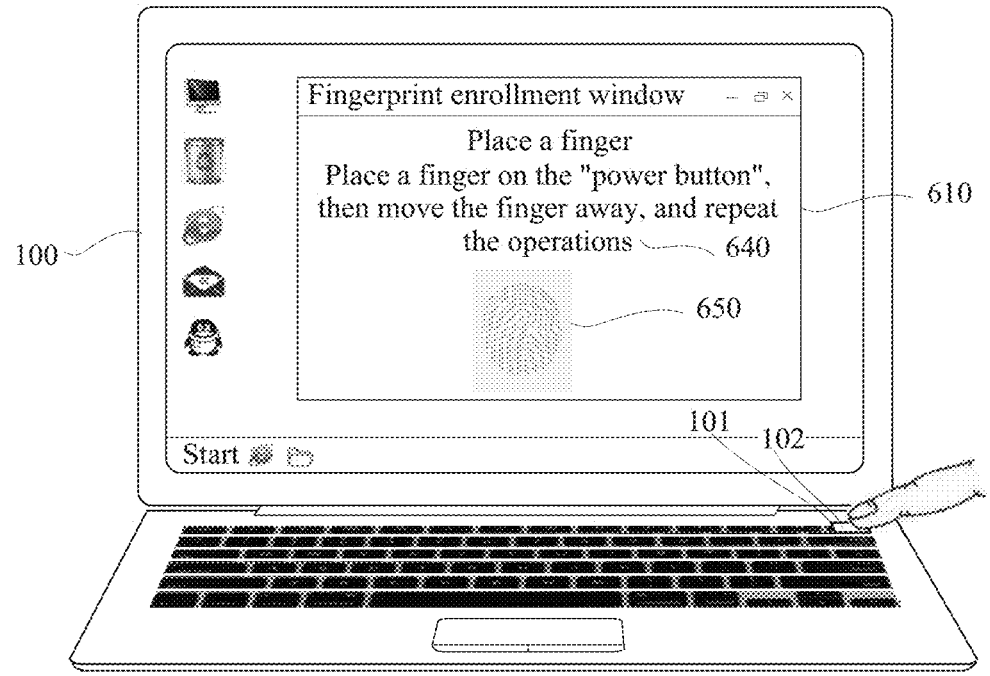

For example, as shown in FIG. 8A, after the finger of the user touches the "power button" 101, the operating system can display second prompt information 640 and a fingerprint filling window 650 in the fingerprint enrollment window 610 shown in FIG. 8B. For example, as shown in FIG. 8B, the second prompt information 640 may be prompt characters including "Place a finger on the 'power button', then move the finger away, and repeat the operations".

It should be noted that in a process of repeating, by the user, the action "Place a finger on the 'power button', then move the finger away" based on a prompt of the second prompt information 640, a dynamic image of gradual filling of fingerprint lines into the fingerprint filling window 650 may be displayed in the fingerprint filling window 650.

Figure 9:
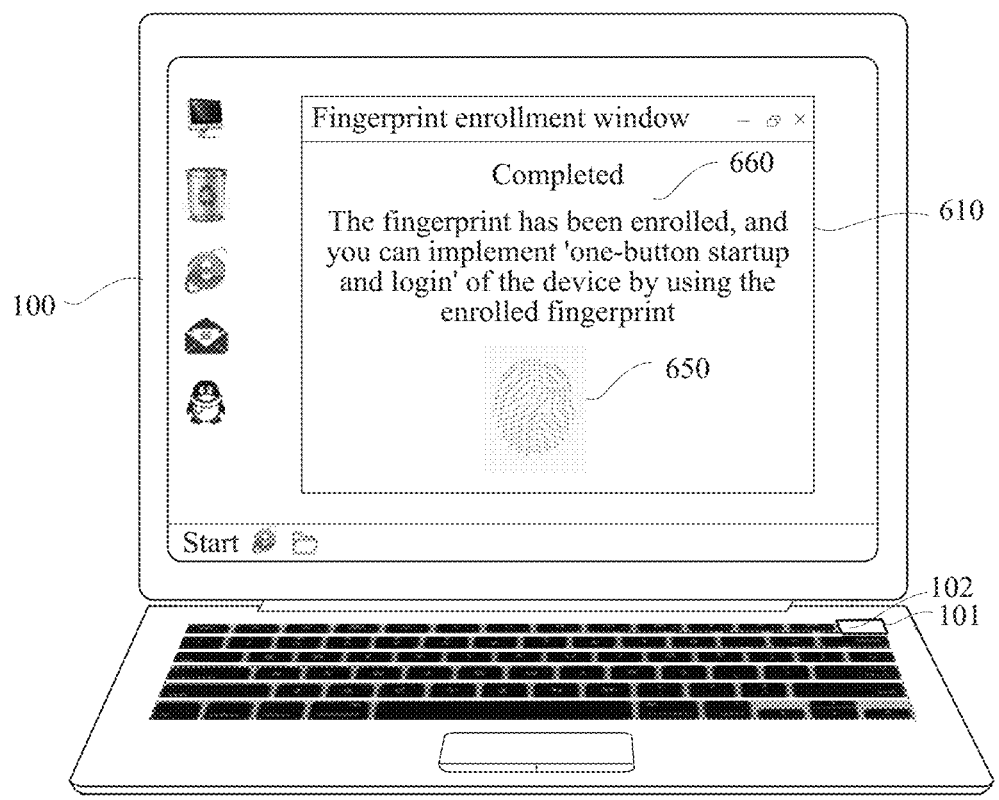
FIG. 9 is schematic diagram 5 of a display interface of a device according to this application.

After the fingerprint drive receives the fingerprint information sent by the first MCU and saves the received fingerprint information in a preset storage area, the operating system can display the fingerprint enrollment window 610 shown in FIG. 9. In this case, third prompt information 660 and the fingerprint filling window 650 filled with fingerprint lines can be displayed in the fingerprint enrollment window 610. For example, as shown in FIG. 9, the third prompt information 660 may be prompt characters including "The fingerprint has been enrolled, and you can implement 'one-button startup and login' of the device only by using the enrolled fingerprint".

Figure 10:
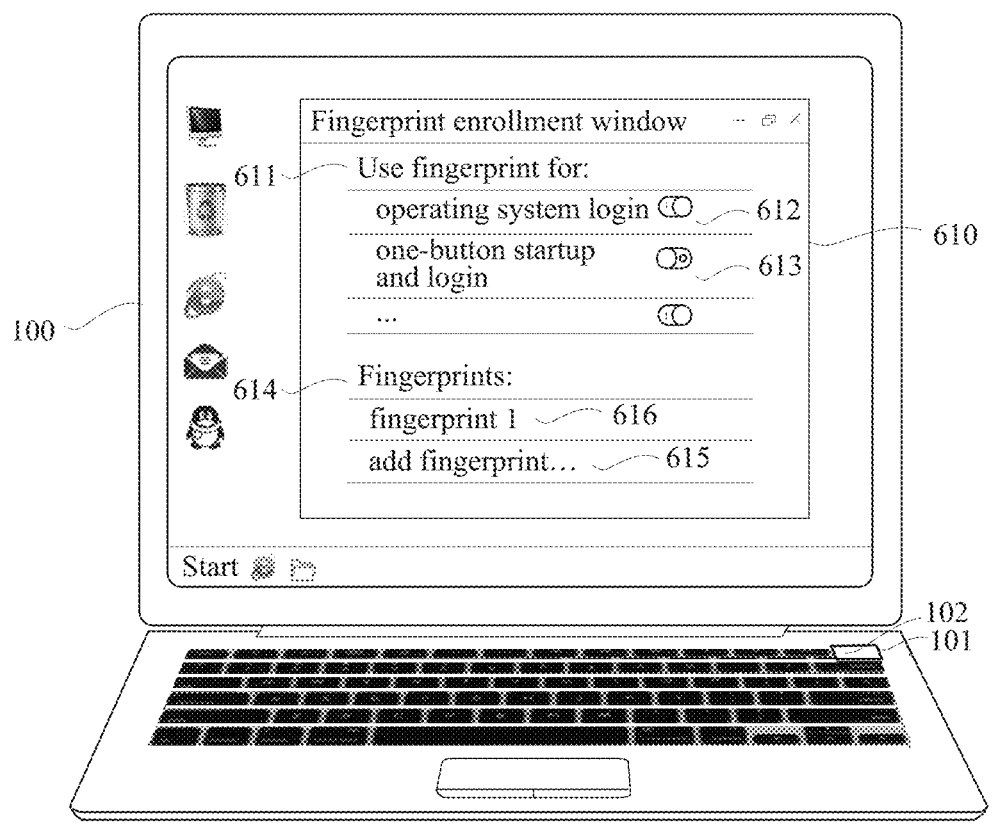
FIG. 10 is schematic diagram 6 of a display interface of a device according to this application.

Further, within a specified period of time after fingerprint is enrolled, that is, within the specified period of time after the fingerprint enrollment window 610 shown in FIG. 9 is displayed, the operating system can display a fingerprint enrollment window 610 shown in FIG. 10. Compared with the "fingerprint list" 614 of the fingerprint enrollment window 610 shown in FIG. 7A, a "fingerprint 1" 616 is added to the "fingerprint list" 614 of the fingerprint enrollment window 610 shown in FIG. 10. The "fingerprint 1" 616 may be used to implement "one-button startup and login" of the device.

It can be understood that the user can enroll fingerprint information of different fingers into the notebook computer 100 in the foregoing fingerprint enrollment manner, so that the different fingers can be used to press the power button of the notebook computer 100, to implement "one-button startup and login" of the notebook computer 100.

Figure 11A:
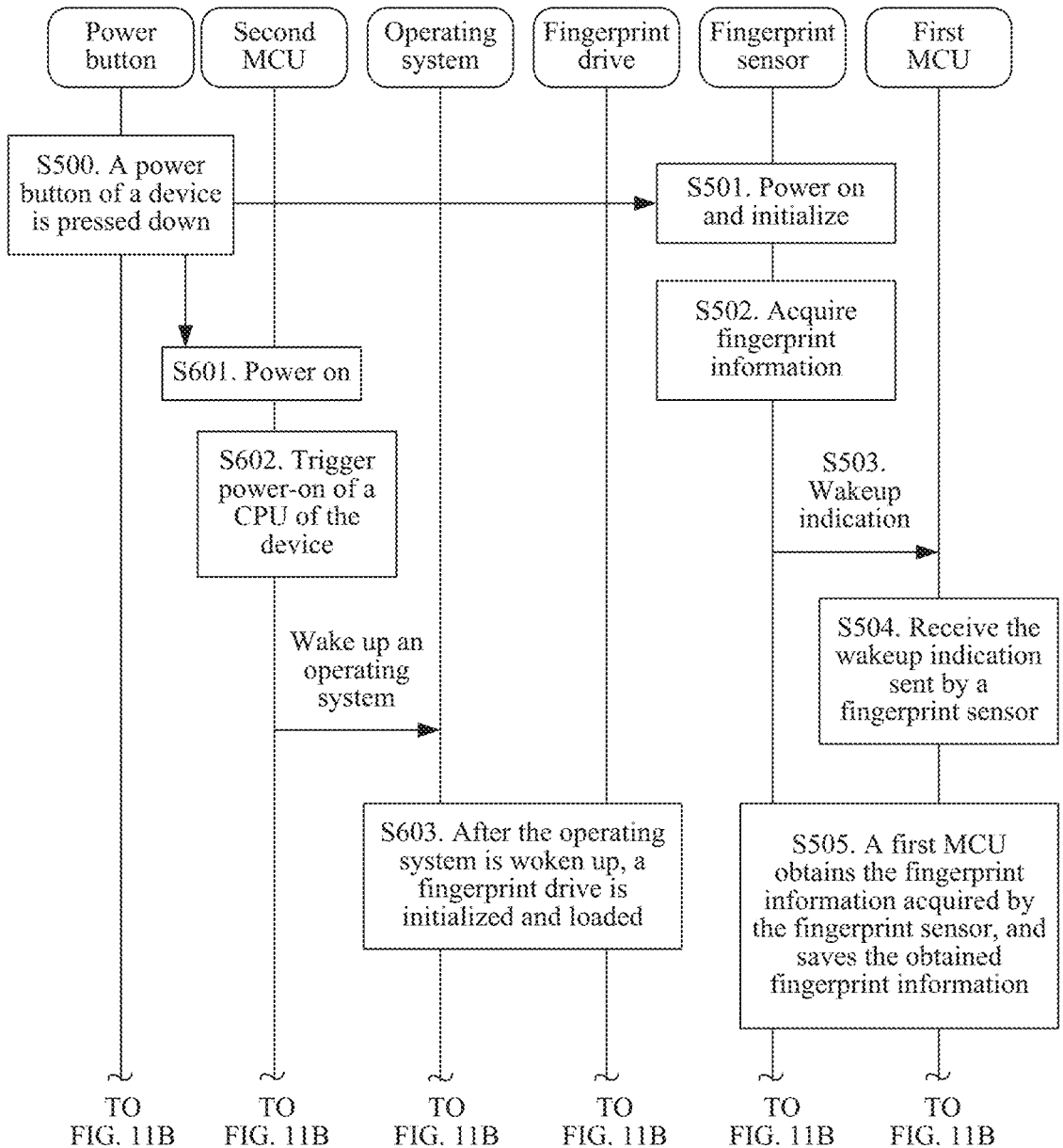
FIG. 11A and FIG. 11B are flowchart 3 of a method for starting up a device according to this application.
Figure 11B:
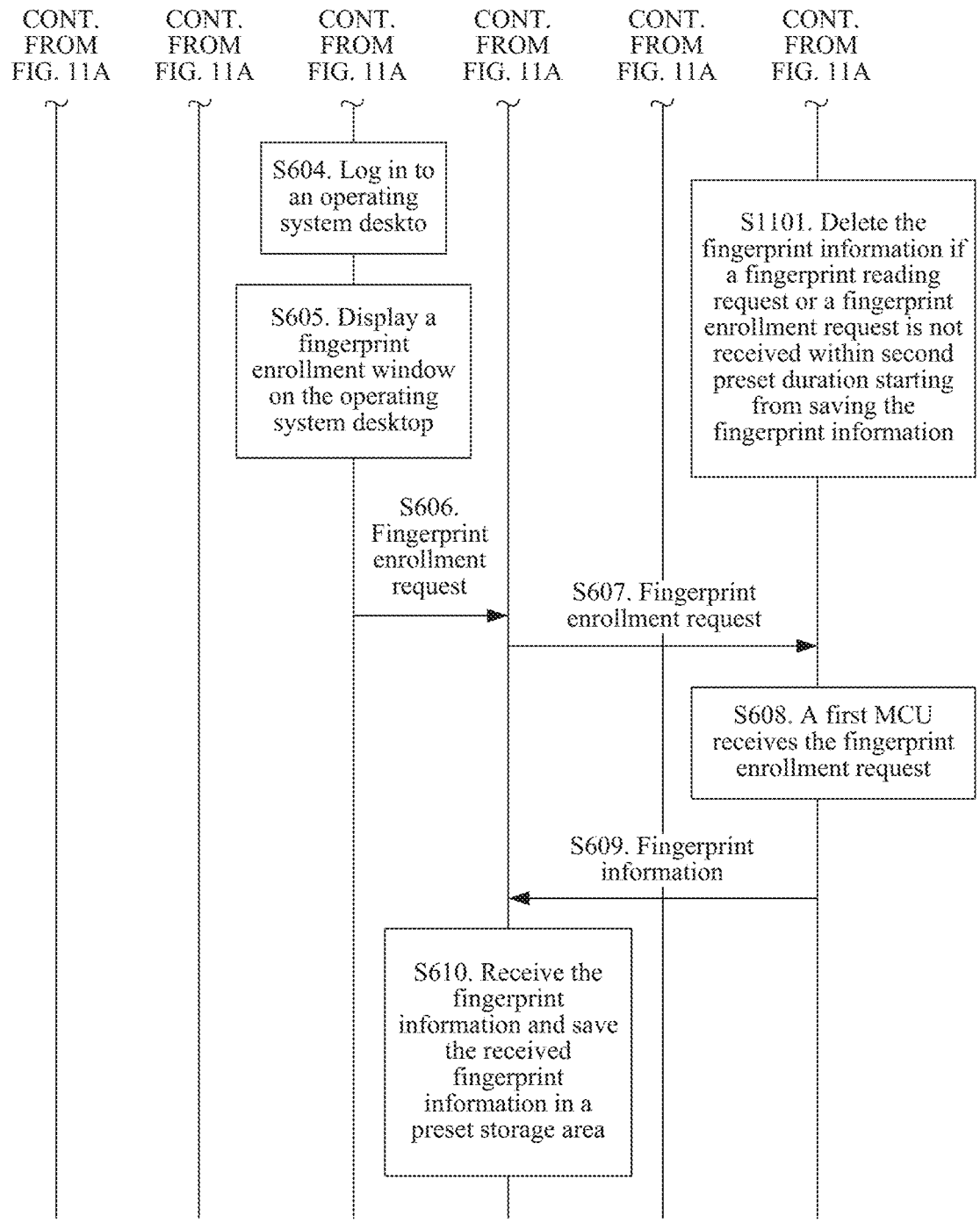

In some cases, after the first MCU saves the fingerprint information, the operating system possibly cannot send a fingerprint authentication request to the fingerprint drive due to a system fault or another cause of the device. Consequently, the fingerprint drive cannot send the fingerprint authentication request to the first MCU in time. Alternatively, the operating system sends a fingerprint authentication request to the fingerprint drive in time, but the fingerprint drive does not send the fingerprint authentication request to the first MCU in time. In this case, the device cannot log in to the operating system desktop in time. Because the device cannot log in to the operating system desktop in time, a normal user may leave the device for a period of time. In the period of time after the normal user leaves, the fingerprint information saved in the first MCU may be in a risk of being stolen by a malicious user to perform user identity authentication and log in to the operating system, and further there is a risk of maliciously stealing the information saved in the device. To ensure information security of the device, the first MCU can delete the fingerprint information saved by the first MCU. Specifically, as shown in FIG. 11B, after S505, the method in this application may further include S1101.

S1101. The first MCU deletes the fingerprint information if the fingerprint authentication request or the fingerprint enrollment request is not received by the first MCU within second preset duration starting from saving the fingerprint information by the first MCU.

Figure 12:
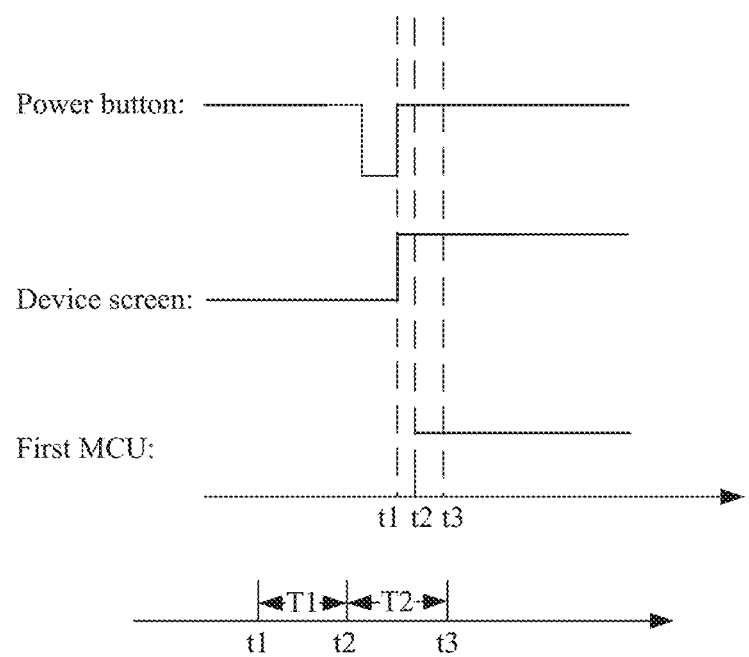
FIG. 12 is schematic diagram 1 of a working time sequence of components of a device according to this application.

For example, in a first application scenario, as shown in FIG. 12, at a time point if, the power button of the device is pressed, and in this case, a screen of the device changes from a screen-off state to a screen-on state, and the fingerprint sensor is powered on and initialized; a time point t2 is reached when duration T1 elapses after the time point t1, and at the time point t2, initialization of the fingerprint sensor is completed, fingerprint information of the user starts to be acquired, and the first MCU is woken up; and the first MCU obtains the fingerprint information from the fingerprint sensor and saves the fingerprint information. A time point t3 is reached when duration T2 (that is, second preset duration) elapses after the time point t2 (a time point at which the first MCU saves the fingerprint information). Within the period of time from the time point t2 to the time point t3, the first MCU can delete the fingerprint information if the fingerprint authentication request or the fingerprint enrollment request is not received by the first MCU.

For example, the second preset duration in this application may be duration (for example, duration t) required from pressing the power button of the device to completing loading of the fingerprint drive of the device, or the second preset duration may be slightly greater than duration t, for example, the second preset duration may be 40 seconds longer than the duration t. For example, the second preset duration may be two minutes or three minutes. Certainly, the second preset duration may alternatively be other duration, and this is not limited in this application.

In this application, if the fingerprint authentication request is not received by the first MCU within the second preset duration starting from saving the fingerprint information by the first MCU, the first MCU can delete the fingerprint information saved by the first MCU. This can prevent a malicious user from using the fingerprint information to perform user identity authentication and stealing information saved in the device when the normal user leaves the device because the device cannot log in to the operating system desktop in time.

Optionally, after initializing and loading the fingerprint drive, the operating system may further send the fingerprint authentication request to the fingerprint drive, and the fingerprint drive obtains the fingerprint information from the first MCU, so as to perform fingerprint authentication and log in to the operating system. However, this is the first time to log in to the operating system after the device is powered on for the first time, and no fingerprint information used to perform fingerprint authentication is enrolled in the fingerprint drive. Therefore, the fingerprint drive cannot perform fingerprint authentication, or a fingerprint authentication result indicates that fingerprint authentication fails. In this case, the operating system can directly log in to the operating system desktop, and display a fingerprint enrollment window on the operating system desktop, so as to instruct the user to enroll the fingerprint information. Specifically, after S603 and before S605, the method in this application may further include S1301.

Figure 13A:
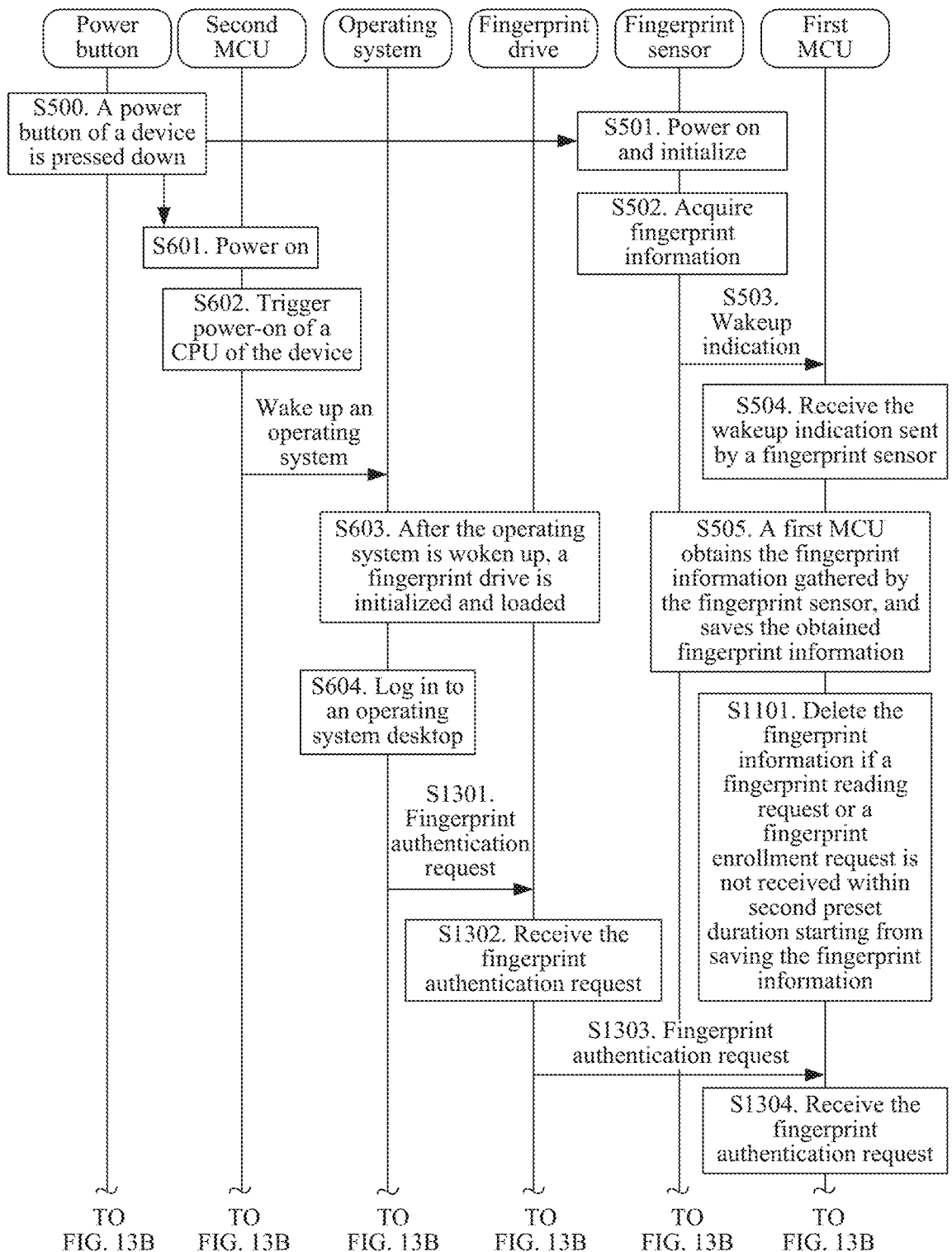
FIG. 13A and FIG. 13B are flowchart 4 of a method for starting up a device according to this application.
Figure 13B:
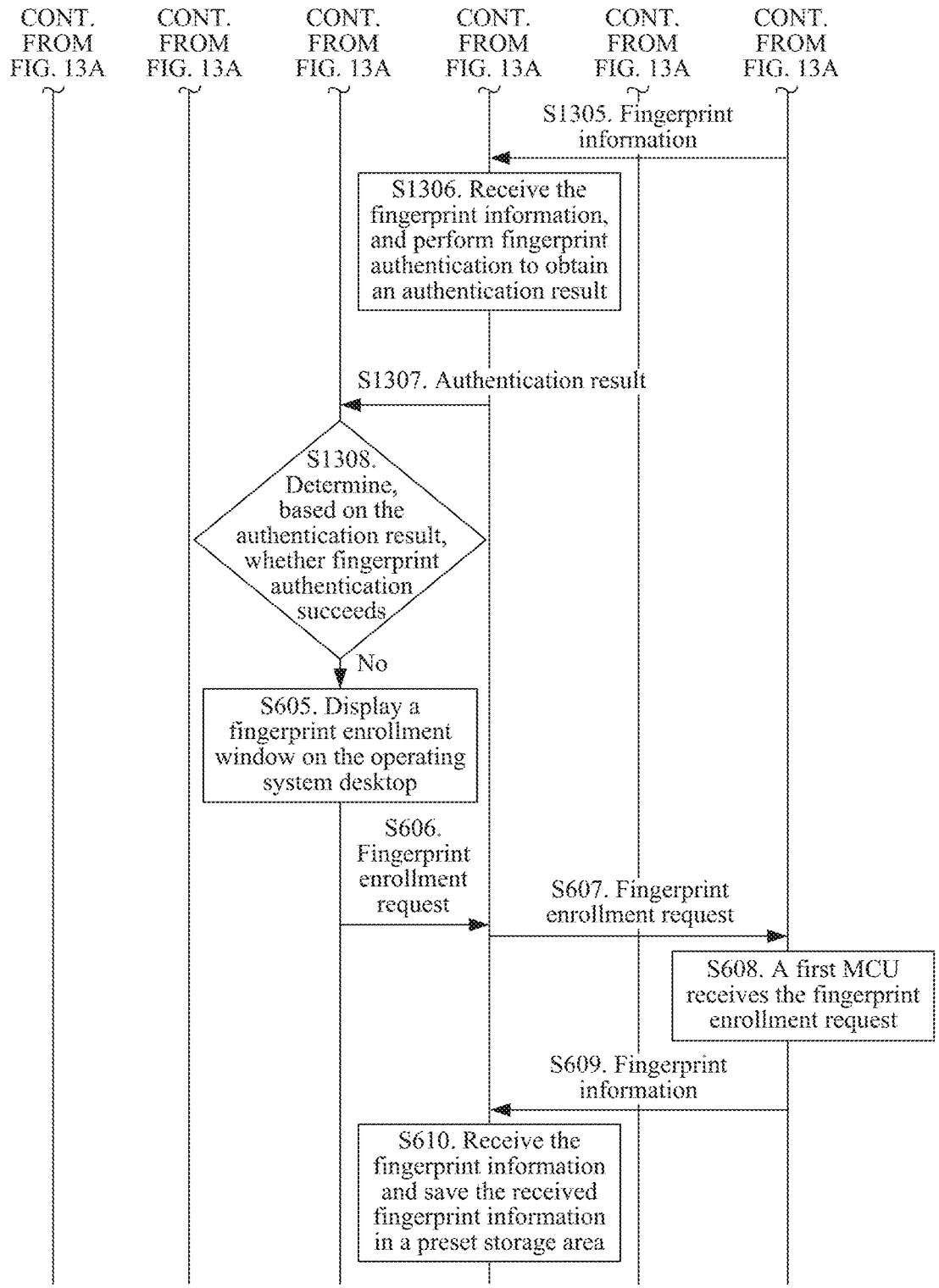

For example, as shown in FIG. 13A and FIG. 13B, after S603 and before S605 shown in FIG. 11, the method in this application may further include S1301 to S1308. For detailed descriptions of method steps shown in FIG. 13A and FIG. 13B, refer to detailed descriptions of the corresponding method steps in FIG. 11 in this application, and details are not described in this application again.

S1301. The operating system sends a fingerprint authentication request to fingerprint drive.

S1302. The fingerprint drive receives the fingerprint authentication request sent by the operating system.

S1303. The fingerprint drive sends the fingerprint authentication request to the first MCU.

S1304. The first MCU receives the fingerprint authentication request sent by the fingerprint drive.

S1305. The first MCU sends the fingerprint information to the fingerprint drive.

S1306. The fingerprint drive receives the fingerprint information, and performs fingerprint authentication to obtain an authentication result.

This is the first time to log in to the operating system after the device is powered on for the first time, and no fingerprint information used to perform fingerprint authentication is enrolled in the fingerprint drive. Therefore, the fingerprint drive cannot perform fingerprint authentication, or a fingerprint authentication result indicates that fingerprint authentication fails.

S1307. The fingerprint drive sends the authentication result to the operating system.

S1308. The operating system determines, based on the authentication result, whether fingerprint authentication succeeds.

In a first application scenario of this embodiment of the present invention, if fingerprint authentication fails, S605 to S610 may continue to be performed.

In this application, the power button is integrated with the fingerprint sensor. Therefore, in the process in which the user presses the power button to power on and start up the device for the first time, the fingerprint sensor can be powered on and initialized when the user presses the power button, acquire the fingerprint information of the user after initialization is completed, and wake up the first MCU to save the fingerprint information. In this way, after the device starts up, the fingerprint information saved by the first MCU can be used to perform user identity authentication, and the user does not need to touch the power button again to enroll the fingerprint information of the user for user identity authentication.

In addition, in the operating system login process after the device is powered on for the first time, the operating system may display a fingerprint enrollment window when fingerprint authentication fails, to instruct the user to enroll fingerprint information used to implement "one-button startup and login" of the device. In this case, the fingerprint information enrolled by the user can be used subsequently to implement "one-button startup and login" of the device, that is, startup and user identity authentication are performed by performing a one-button startup operation by the user. This can reduce user operations and duration that are required for device startup and system login, and improve device startup efficiency and system login efficiency.

Further, to improve fingerprint information security and prevent fingerprint information from being stolen, the first MCU may encrypt the fingerprint information acquired by the fingerprint sensor and save the encrypted fingerprint information. The first MCU may encrypt the fingerprint information by using an encryption password preset by the user, or the first MCU may encrypt the fingerprint information by using an encryption password negotiated with the fingerprint drive.

After being loaded, the fingerprint drive may negotiate with the first MCU for the encryption password of the fingerprint information. Specifically, before S606 and S1301, the method in this application may further include: sending, by the fingerprint drive, a password request message to the first MCU; sending, by the first MCU, a password response message carrying an encryption password to the fingerprint drive after receiving the password request message sent by the fingerprint drive; and receiving and saving, by the fingerprint drive, the encryption password.

It can be understood that the first MCU can encrypt, by using the encryption password, the fingerprint information obtained from the fingerprint sensor. In addition, the fingerprint information sent by the first MCU to the fingerprint drive is the fingerprint information encrypted by using the encryption password. The fingerprint drive may decrypt, by using the encryption password saved by the fingerprint drive, the encrypted fingerprint information received by the fingerprint drive.

Alternatively, the fingerprint drive and the first MCU may use an asymmetric encryption algorithm to encrypt and decrypt the fingerprint information. For example, the fingerprint drive may send a public key (public key) to the first MCU, to instruct the first MCU to encrypt the fingerprint information by using the public key, and the fingerprint drive may use a private key (private key) corresponding to the public key to decrypt the fingerprint information encrypted by using the public key.

In a second application scenario of this application, after the device example, a notebook computer 100) is powered on for the first time for operating system login, descriptions are provided for the startup and system login process of the device.

In the second application scenario, the device being the notebook computer 100 is used as an example. Because the fingerprint sensor 102 of the notebook computer 100 has been powered on and initialized, even if the notebook computer 100 is in a down state, the fingerprint sensor 102 can still acquire the fingerprint information of the user that touches the power button 101.

Figure 14A:
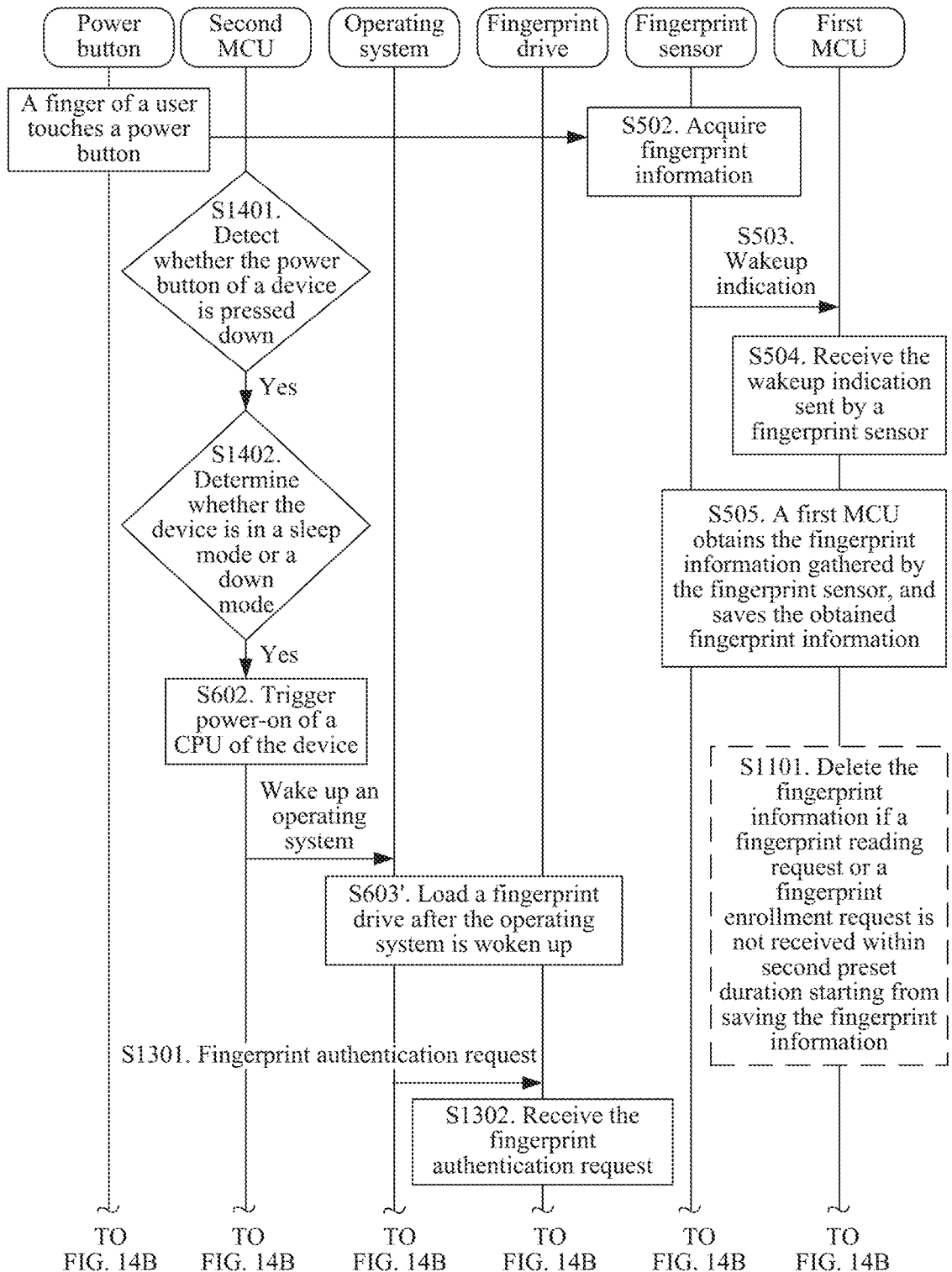
FIG. 14A and FIG. 14B are flowchart 5 of a method for starting up a device according to this application.

In addition, as shown in FIG. 14A, in the second application scenario of this application, when a finger of the user touches the fingerprint sensor 102, the fingerprint sensor 102 can acquire the fingerprint information of the user (that is, perform S502 to S505). That is, in the second application scenario of this application, S501 may not be performed.

Figure 14B:
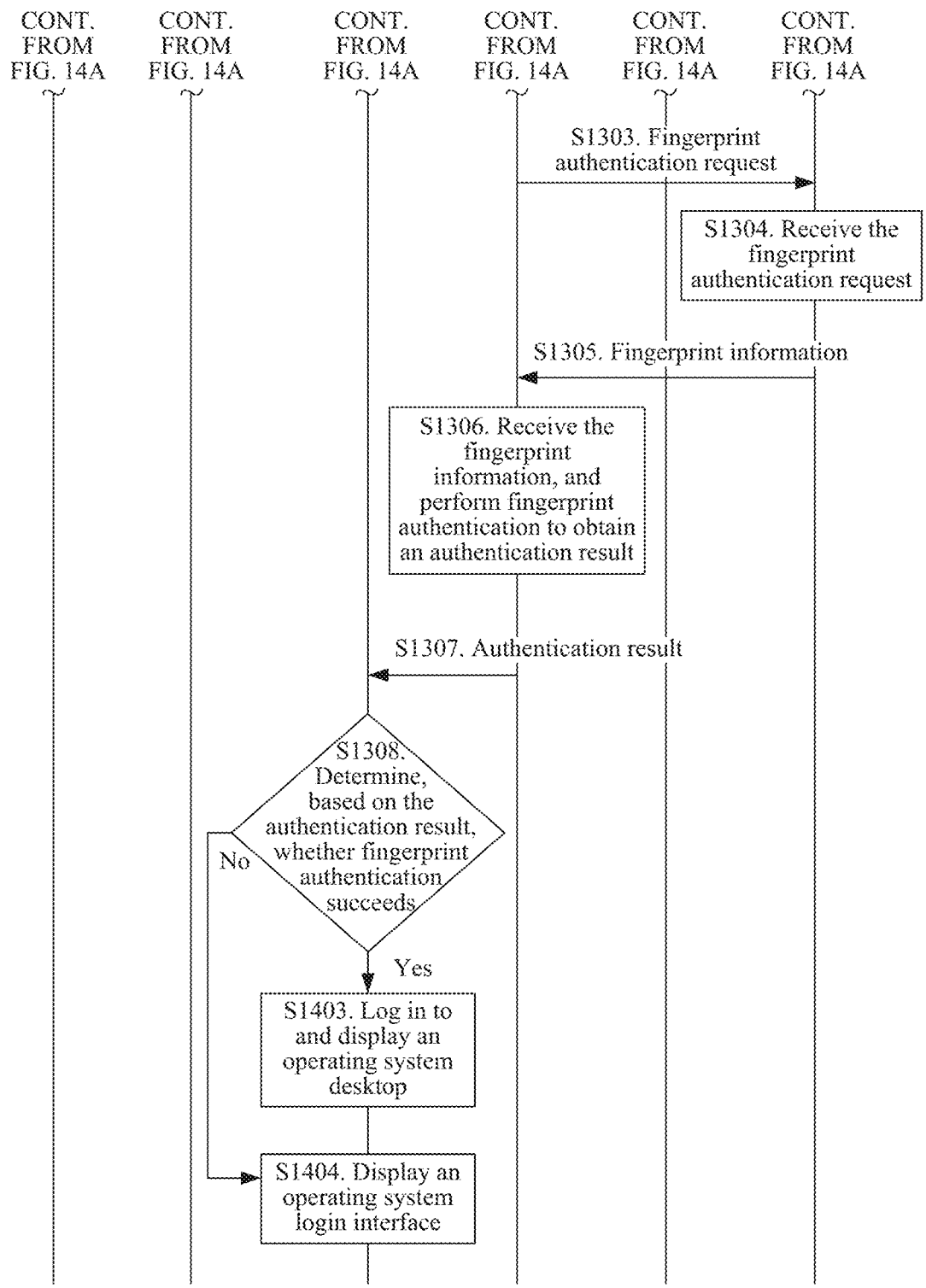

In the second application scenario, a second MCU of the device also completes initialization and is powered on. Therefore, the second MCU can detect, in real time, whether the power button of the device is pressed. That is, as shown in FIG. 14A and FIG. 14B, the method in this application may further include S1401 and a subsequent method procedure.

S1401. The second MCU detects whether the power button of the device is pressed.

If the user wants to start up the device, the user can press the power button of the device within a short period of time (for example, 1 to 3 seconds) that elapses after a finger of the user touches the power button.

S1402. The second MCU determines whether the device is in a sleep mode or a down mode.

In many cases, the user presses the power button. For example, the user may press the power button when controlling the device to start up, or the user may press the power button when controlling the device to shut down. To avoid performing the method in this application in another scenario other than the scenario in which the user controls the device to start up, the second MCU may trigger power-on of the CPU of the device only when detecting that the power button is pressed and determining that the device is in the sleep mode or the down mode, and wake up the operating system of the device.

Specifically, when the device is in the sleep mode or the down mode, S602 may continue to be performed. That is, in the second application scenario of this application, S601 may be skipped. In addition, initialization of the fingerprint drive of the device has been completed when the device was powered on for the first time. Therefore, in the second application scenario of this application, after S602 is performed, the fingerprint drive may be directly loaded, and the fingerprint drive does not need to be initialized. That is, as shown in FIG. 14A, S603 may be replaced by S603':

S603'. Load the fingerprint drive after the operating system is woken up.

In the second application scenario, the fingerprint information used to perform fingerprint authentication to implement "one-button startup and login" may have been enrolled in the device. Therefore, the operating system cannot directly log in to the operating system desktop (that is, perform S604) without fingerprint authentication. In this case, after S603' is performed, the operating system can directly send a fingerprint authentication request to the fingerprint drive, that is, after S603' is performed, S1301 to S1308 may be performed. For detailed descriptions of S1301 to S1308 in FIG. 14A and FIG. 14B, refer to detailed descriptions of S1301 to S1308 in the foregoing embodiment in this application, and details are not described in this application again.

A difference lies in that in the second application scenario, after S1308, if the authentication result indicates that fingerprint authentication succeeds, it indicates that user identity authentication succeeds, and in this case, S1403 may continue to be performed; or if the authentication result indicates that fingerprint authentication succeeds, it indicates that user identity authentication fails. In this case, instead of directly logging in to the operating system to display the operating system desktop, the user needs to re-enter a user name and a password or the user needs to re-enroll fingerprint information, to perform user identity authentication again, and in this case, S1404 may continue to be performed.

S1403. Log in to the operating system and display an operating system desktop.

S1404. The operating system displays an operating system login interface.

Further, if the authentication result indicates that fingerprint authentication fails, the operating system may further display, in the operating system login interface, indication information indicating a login failure.

For example, when the authentication result indicates that fingerprint authentication fails, the operating system may display the operating system login interface shown in FIG. 2B.

According to the method for starting up a device provided in this application, when the user touches the fingerprint sensor integrated onto the power button of the device, the fingerprint sensor can acquire the fingerprint information of the user and wake up the first MCU to obtain and save the acquired fingerprint information, and after the user presses the power button of the device to control the device to start up, the fingerprint information saved by the first MCU can be used to perform user identity authentication. After the user presses the power button to control the device to start up and the operating system login interface of the device is displayed, the user does not need to re-enroll the fingerprint information of the user to perform user identity authentication. That is, in this solution, user identity authentication can be performed simultaneously when the device starts up, to log in to the operating system of the device. That is, startup and user identity authentication can be implemented by performing a one-button startup operation by the user. This can reduce user operations and duration that are required for device startup and system login, and improve device startup efficiency and system login efficiency.

It can be understood that in the second application scenario, when the user mistakenly touches the power button of the device, the fingerprint sensor may also acquire the fingerprint information of the user. The fingerprint information may be used to perform user identity authentication. In this case, if a malicious user seizes a chance to press the power button, device startup and user identity authentication can be implemented, and information saved in the device may be stolen.

Further, to keep a malicious user from seizing a chance to steal information saved in the device, after the first MCU saves the fingerprint information, if the power button of the device is not pressed within a specified period of time, the first MCU can delete the fingerprint information saved by the first MCU, so as to prevent the malicious user from using, after the user mistakenly touches the power button of the device, the fingerprint information saved by the first MCU, to perform user identity authentication.

Figure 15A:
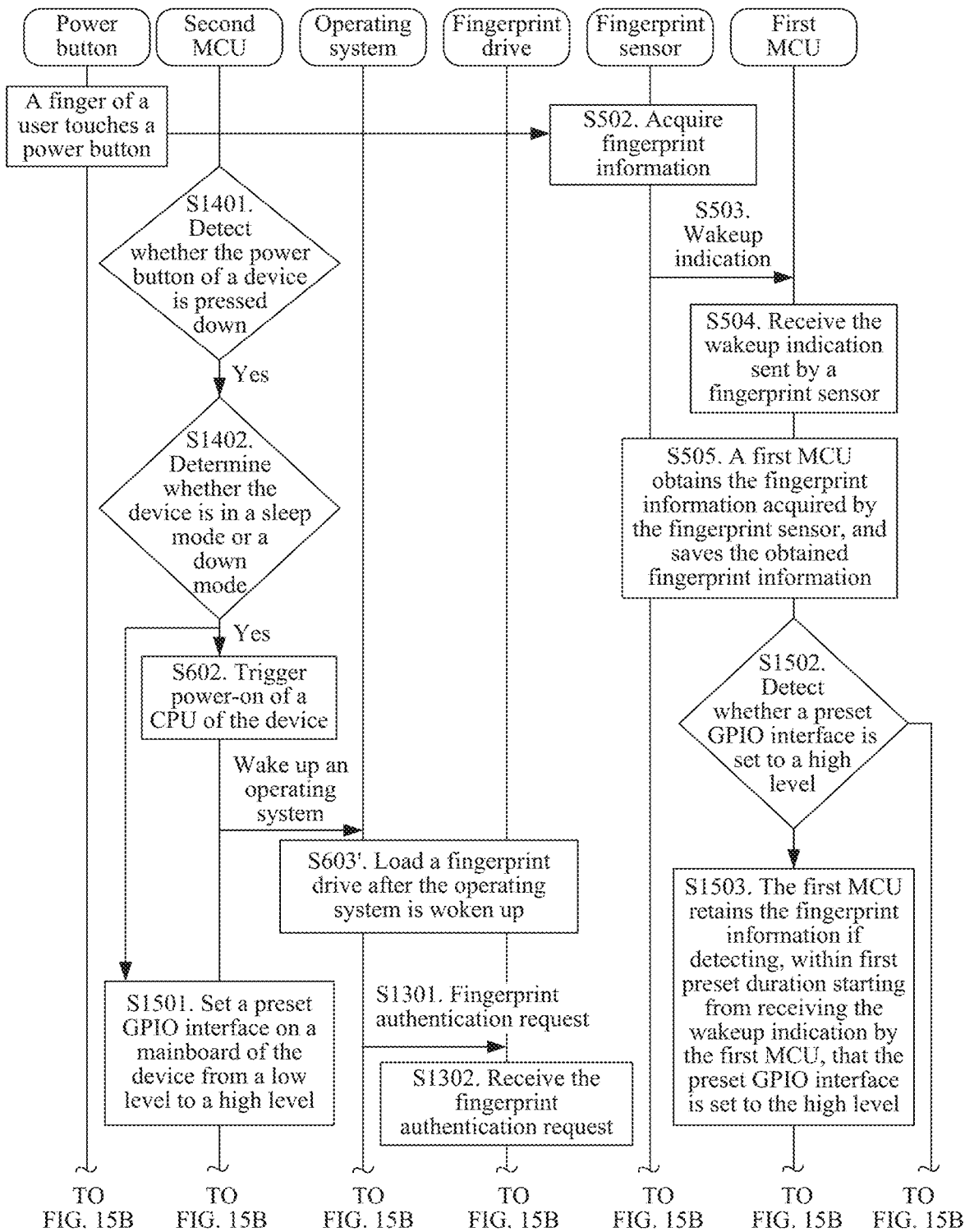
FIG. 15A and FIG. 15B are flowchart 6 of a method for starting up a device according to this application.
Figure 15B:
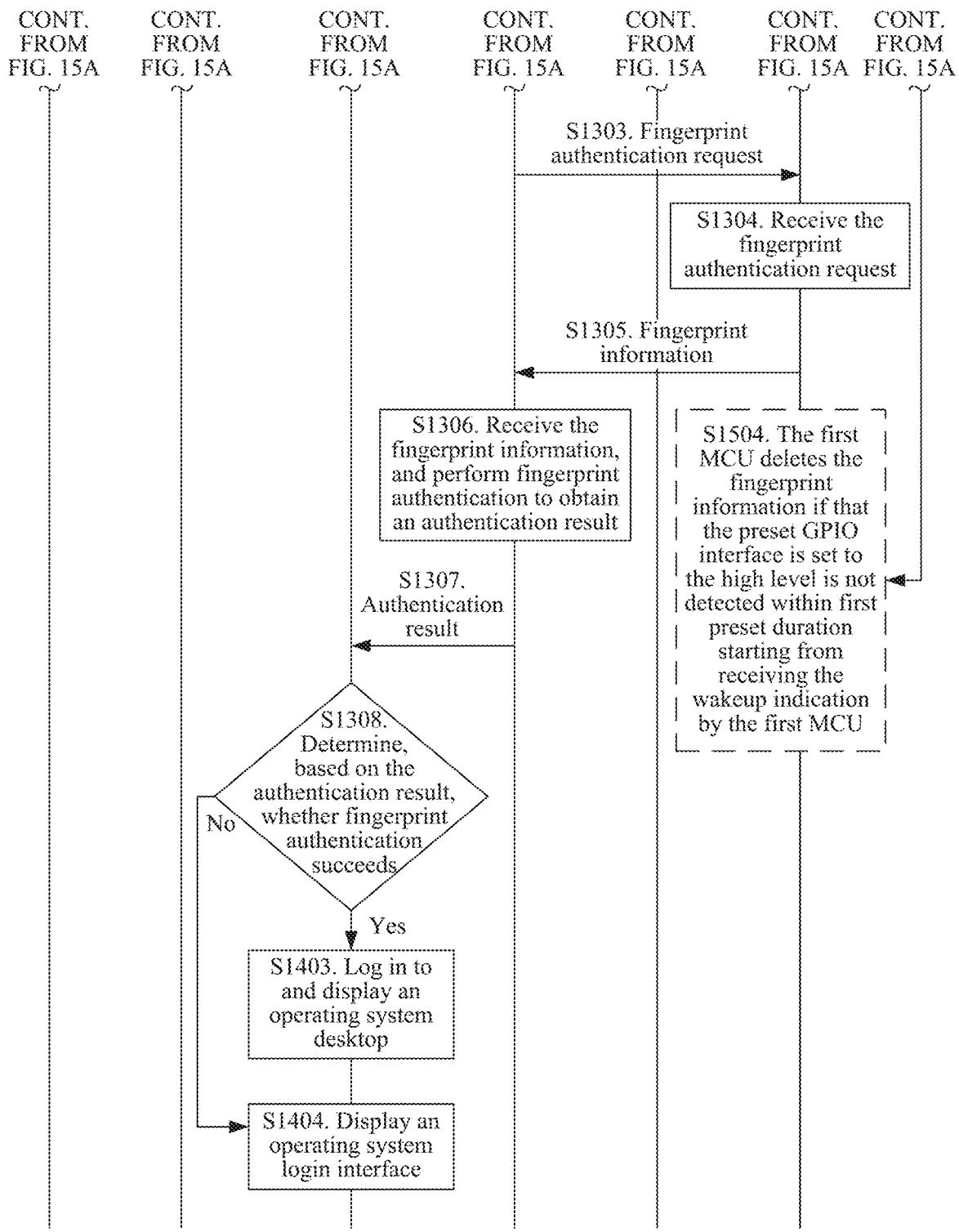

For example, as shown in FIG. 15A, after S1402 is performed, if the device is in the sleep mode or the down mode, S1501 may further continue to be performed. In addition, as shown in FIG. 15A, after S505 is performed, the method in this application may further include S1502 or S1503.

S1501. The second MCU sets a preset GPIO interface on a mainboard of the device to a high level from a low level.

Figure 16:
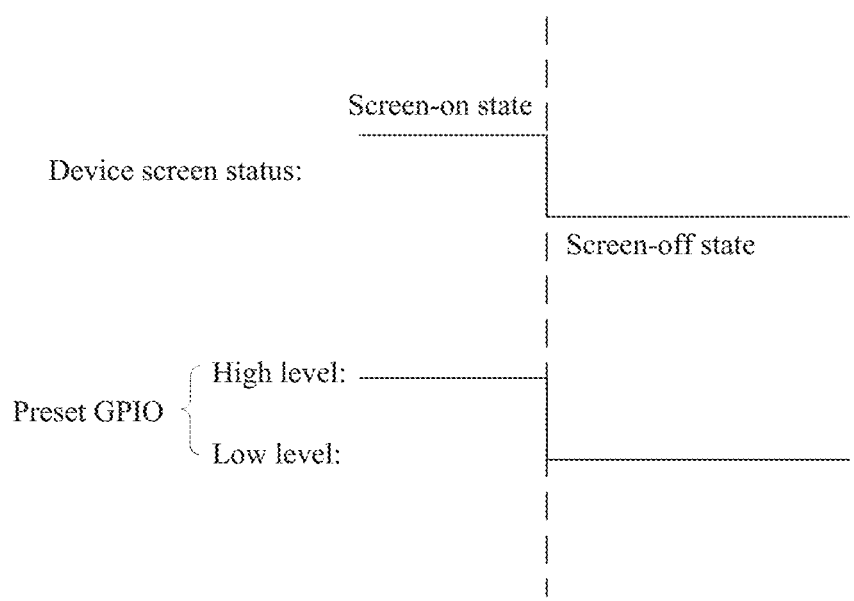
FIG. 16 is flowchart 7 of a method for starting up a device according to this application.

As shown in FIG. 16, the second MCU may set the preset GPIO interface on the mainboard of the device to the low level when the device changes from a screen-on state to a screen-off state.

In this application, that the device is in a screen-off state may include: The device is in a screen-off state in a working mode (marked as S0), or the device is in a screen-off state in a sleep mode or a down mode (marked as Sx).

For example, assuming that the device is a notebook computer 100, that the notebook computer 100 is in a screen-off state in a working mode means that when the notebook computer 100 is in the working mode, because a user does not operate the notebook computer 100 within a period of time (for example, 5 minutes), the notebook computer 100 controls a display of the notebook computer 100 to enter a black-screen state, to reduce power consumption. In the screen-off state in the working mode, the notebook computer 100 can re-enter the working mode, provided that the user taps a touch area of the notebook computer 100 or any key on a keyboard or that the user moves an externally connected mouse of the notebook computer 100.

That the notebook computer is in a screen-off state in a sleep mode means that when the notebook computer is in the working mode, because the user does not operate the notebook computer within a long time (for example, 30 minutes), the notebook computer automatically enters the sleep mode and a display of the notebook computer enters a black-screen state, to reduce power consumption and ensure information security. In the screen-off state in the sleep mode. The user does not need to press the power button to control the notebook computer to restart, but to control the notebook computer to re-enter the working mode, the user further needs to re-enter a user name and a password or re-enroll fingerprint information in an operating system login interface, to perform user identity authentication.

That the device is in a screen-off state may include: The device is in a screen-off state in a working mode, the device is in a screen-off state in a sleep mode or a down mode, or the like; and when the device is in the screen-off state in the working mode, user identity authentication is not needed. Therefore, when the device is in the sleep mode or the down mode Sx, if detecting that the power button is pressed, the second MCU can set the preset GPIO interface on the mainboard of the device to the high level from the low level, so that the first MCU can retain the fingerprint information after detecting that the preset GPIO interface is set to the high level.

S1502. The first MCU detects whether the preset GPIO interface is set to a high level.

S1503. The first MCU retains the fingerprint information if the first MCU detects, within first preset duration starting from receiving the wakeup indication by the first MCU, that the preset GPIO interface is set to the high level.

S1504. The first MCU deletes the fingerprint information if the first MCU does not detect, within first preset duration starting from receiving the wakeup indication by the first MCU, that the preset GPIO interface is set to the high level.

If a normal user wants to start up the device, the user usually presses the power button of the device within a short period of time (for example, 1 to 3 seconds) that elapses after a finger of the user touches the power button. In this case, if the normal user needs to start up the device, the second MCU can detect, within a short period of time (that is, the first preset duration, for example, 1 to 3 seconds) starting from saving the fingerprint information by the first MCU, that the power button is pressed, and can set the preset GPIO interface from the low level to the high level. That is, the first MCU can detect, within the short period of time (that is, the first preset duration, for example, 1 to 3 seconds) starting from saving the fingerprint information by the first MCU, that the preset GPIO interface is set to the high level. Conversely, if the second MCU detects that the power button is not pressed within a short period of time (that is, the first preset duration, for example, 1 to 3 seconds) starting from saving the fingerprint information by the first MCU, it indicates that the fingerprint information acquired by the fingerprint sensor may be generated by mistakenly touching the power button by the user.

To prevent a malicious user from using the fingerprint information acquired by the fingerprint sensor when the normal user mistakenly touches the power button, to perform user identity authentication and steal information saved in the device, the first MCU can delete the fingerprint information if the first MCU does not detect, within the first preset duration starting from saving the fingerprint information by the first MCU, that the preset GPIO interface is set to the high level (that is, the second MCU does not set the preset GPIO interface to the high level from the low level because the second MCU does not detect that the power button is pressed).

The first preset duration may be duration of 1 to 3 seconds. Within the first preset duration that elapses after the normal user mistakenly touches the power button, the normal user usually keeps looking at the device. Therefore, there is a relatively small possibility that a malicious user uses, within the first preset duration that elapses after the normal user mistakenly touches the power button, the fingerprint information generated by mistakenly touching the power button by the normal user, to perform user identity authentication and steal information saved in the device. After the first preset duration that elapses after the normal user mistakenly touches the power button, even if the malicious user presses the power button, the malicious user cannot pass user identity authentication and cannot steal information saved in the device, without the fingerprint information of the normal user, because the fingerprint information saved by the first MCU has been deleted.

Figure 18:
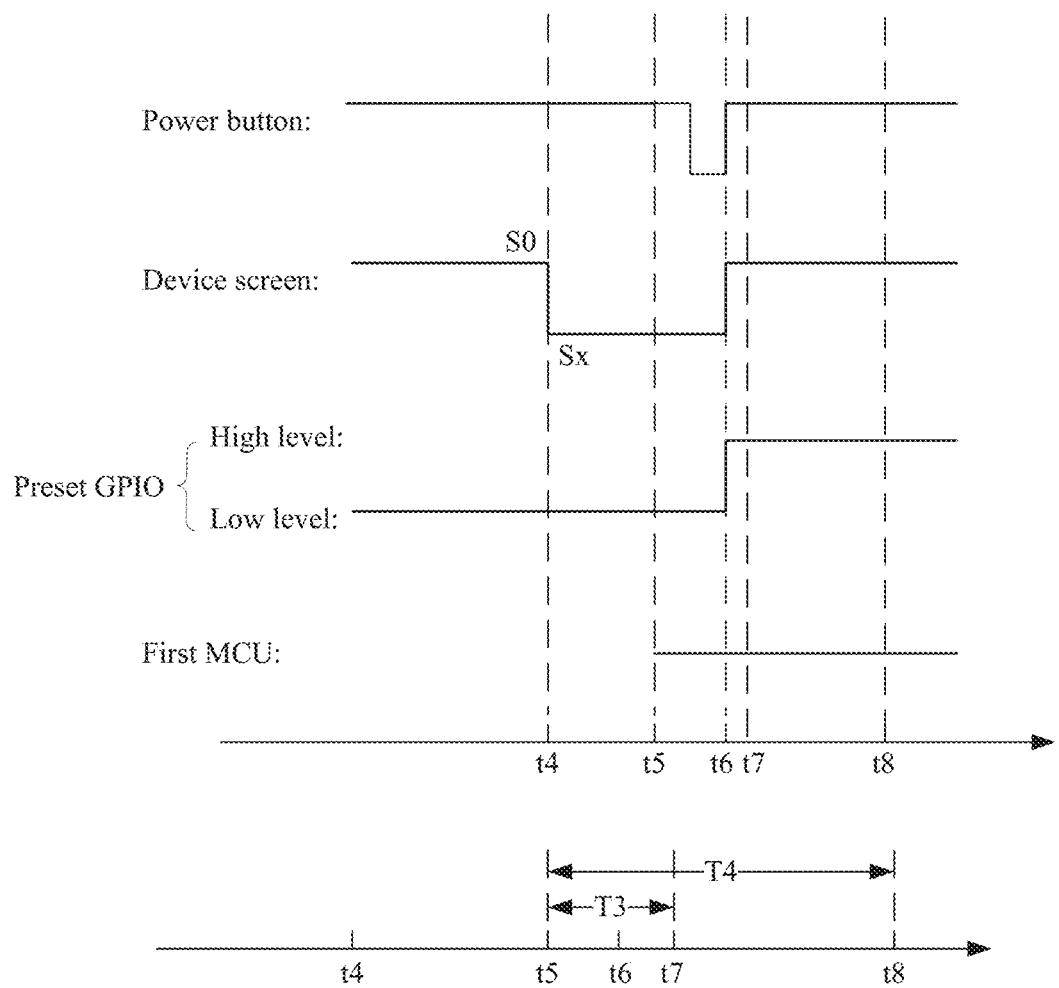
FIG. 18 is schematic diagram 2 of a working time sequence of components of a device according to this application.

For example, as shown in FIG. 18, at a time point t4, the device changes from the working mode (S0) to the sleep mode or the down mode (Sx). In this case, the device changes from a screen-on state to a screen-off state, and the preset GPIO interface on the mainboard of the device is set to a low level. At a time point t5 shown in FIG. 18, a user touches the power button of the device. In this case, the fingerprint sensor integrated onto the power button can acquire the fingerprint information of the user. If detecting, at a time point t6 shown in FIG. 18, that the power button is pressed, the second MCU can set the preset GPIO interface to the high level; and if detecting, within a period of time from the time point t5 to a time point t7 (that is, first preset duration T3 starting from receiving the wakeup indication by the first MCU), that the preset GPIO interface is set to the high level, the first MCU can retain the fingerprint information; or the first MCU can delete the fingerprint information if the first MCU does not detect, within a period of time from the time point t5 to a time point t7, that the preset GPIO interface is set to the high level.

The first MCU can delete the fingerprint information if the first MCU does not detect, within the first preset duration starting from receiving the wake-up indication by the first MCU, that the preset GPIO interface is set to the high level. In this case, after the first MCU receives the fingerprint authentication request sent by the fingerprint drive (that is, S1303), the first MCU sends a fingerprint expiration indication to the fingerprint drive instead of sending the fingerprint information to the fingerprint drive (that is, perform S1305). That is, after S1303 and S1504, the method in this application may include: sending, by the first MCU, the fingerprint expiration indication to the fingerprint drive; receiving, by the fingerprint drive, the fingerprint expiration indication, and returning a fingerprint authentication failure indication to an operating system; and receiving, by the operating system, the fingerprint authentication failure indication, and displaying an operating system login interface.

Optionally, if the operating system receives the fingerprint authentication failure indication, the operating system may further display login failure indication information in the operating system login interface.

Figure 17A:
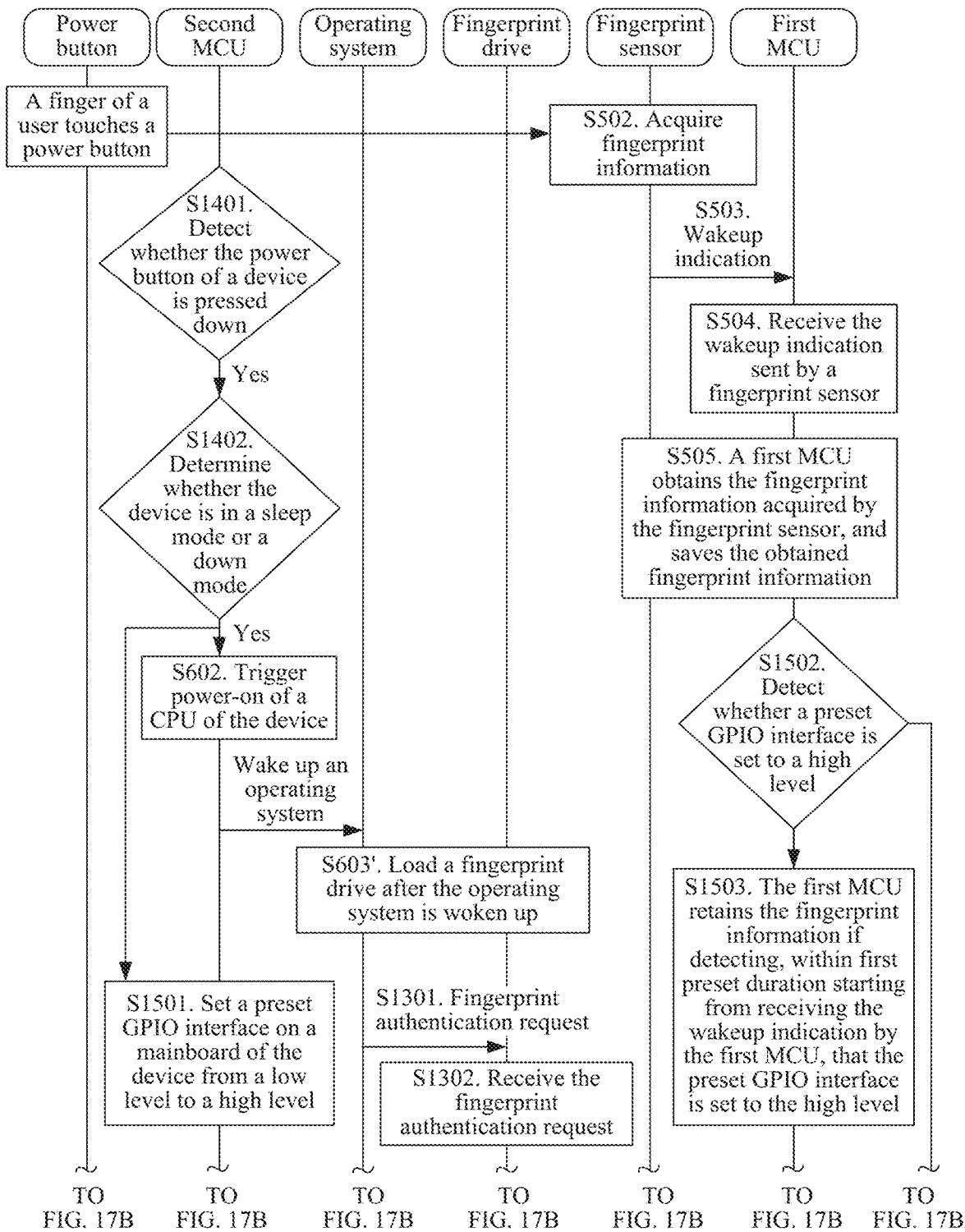
FIG. 17A and FIG. 17B are a schematic diagram of a GPIO setting time sequence according to this application.
Figure 17B:
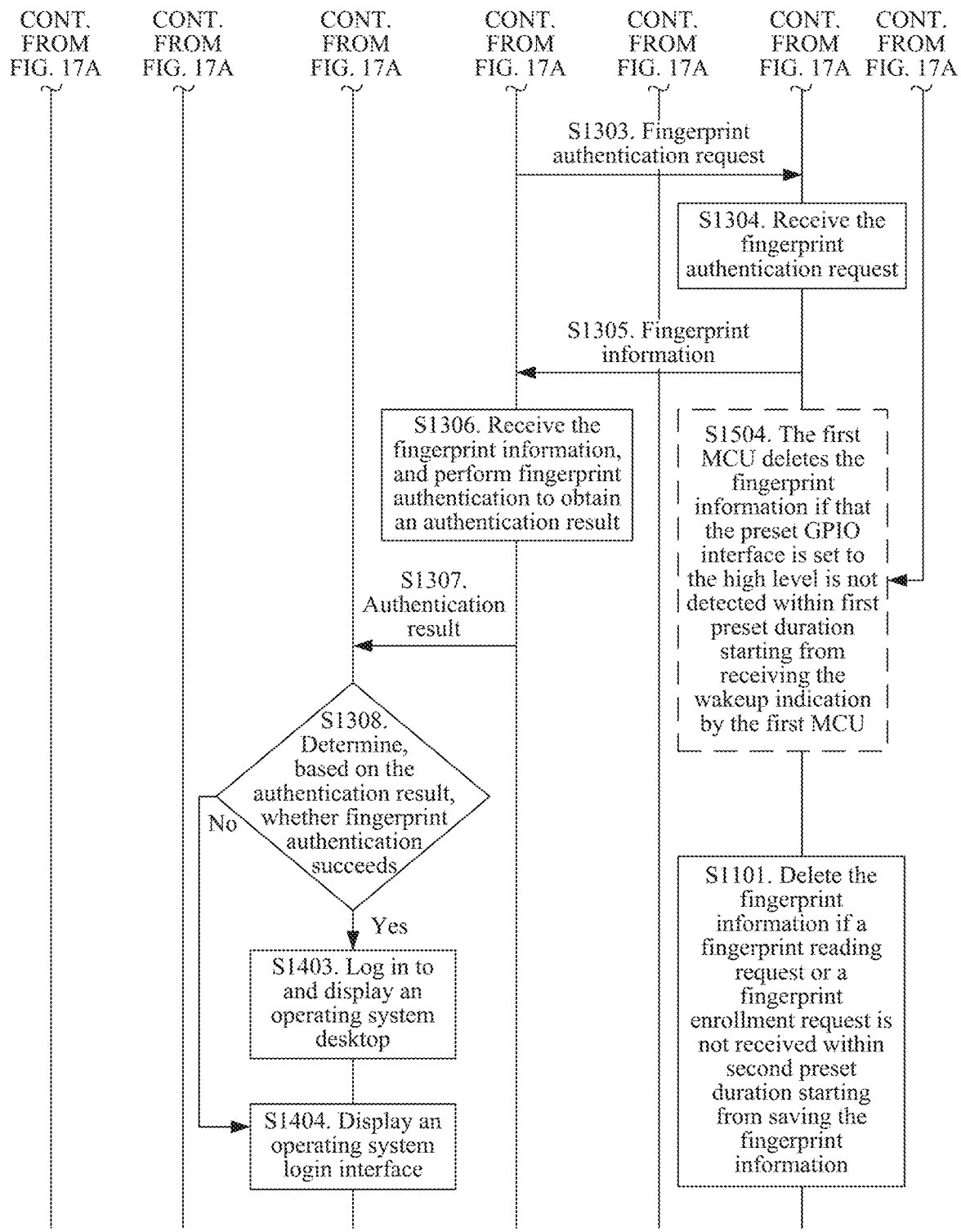

In some cases, after the first MCU saves the fingerprint information (that is, performs S505), the operating system possibly cannot send the fingerprint authentication request to the fingerprint drive (that is, perform S1303) in time due to a system fault or another cause of the device. Consequently, the fingerprint drive cannot send the fingerprint authentication request to the first MCU in time, or the operating system has sent a fingerprint authentication request to the fingerprint drive in time, but the fingerprint drive does not send the fingerprint authentication request to the first MCU (that is, perform S1303) in time. In this case, the device cannot log in to the operating system desktop in time. Because the device cannot log in to the operating system desktop in time, a normal user may leave the device for a period of time. In the period of time after the normal user leaves, the fingerprint information saved in the first MCU may be in a risk of being stolen by a malicious user to perform user identity authentication and log in to the operating system, and further there is a risk of maliciously stealing the information saved in the device. To ensure information security of the device, the first MCU can delete the fingerprint information saved by the first MCU. Specifically, as shown in FIG. 17B, the method in this application may further include S1101.

For example, as shown in FIG. 18, the first MCU can delete the fingerprint information if the fingerprint authentication request or the fingerprint enrollment request is not received by the first MCU within a period of time, to be specific, second preset duration (T4) from a time point t7 to a time point t8.

In this application, if the fingerprint authentication request is not received by the first MCU within the second preset duration starting from saving the fingerprint information by the first MCU, the first MCU can delete the fingerprint information saved by the first MCU. This can prevent a malicious user from using the fingerprint information to perform user identity authentication and stealing information saved in the device when the normal user leaves the device because the device cannot log in to the operating system desktop in time.

Figure 19A:
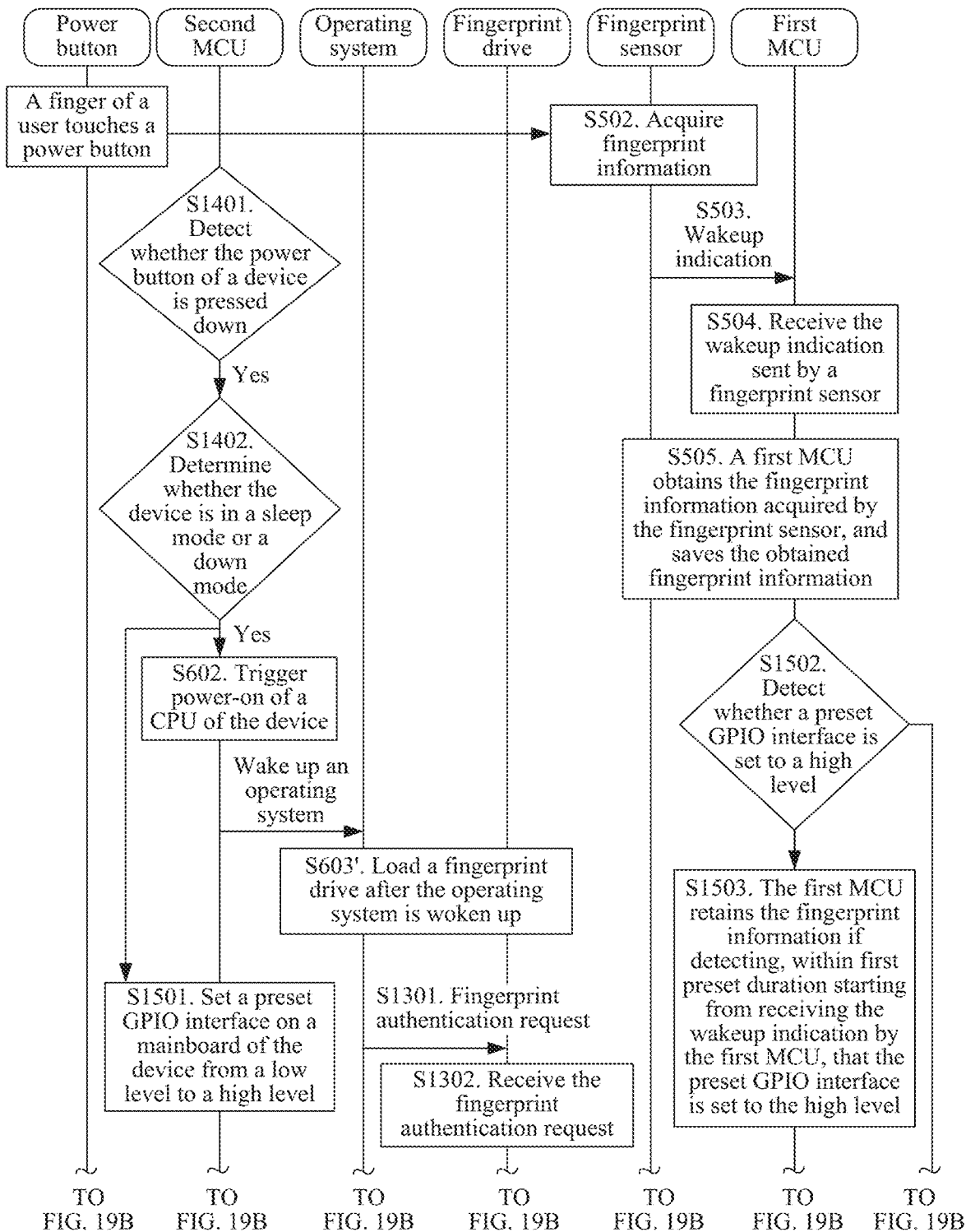
FIG. 19A and FIG. 19B are flowchart 8 of a method for starting up a device according to this application.
Figure 19B:
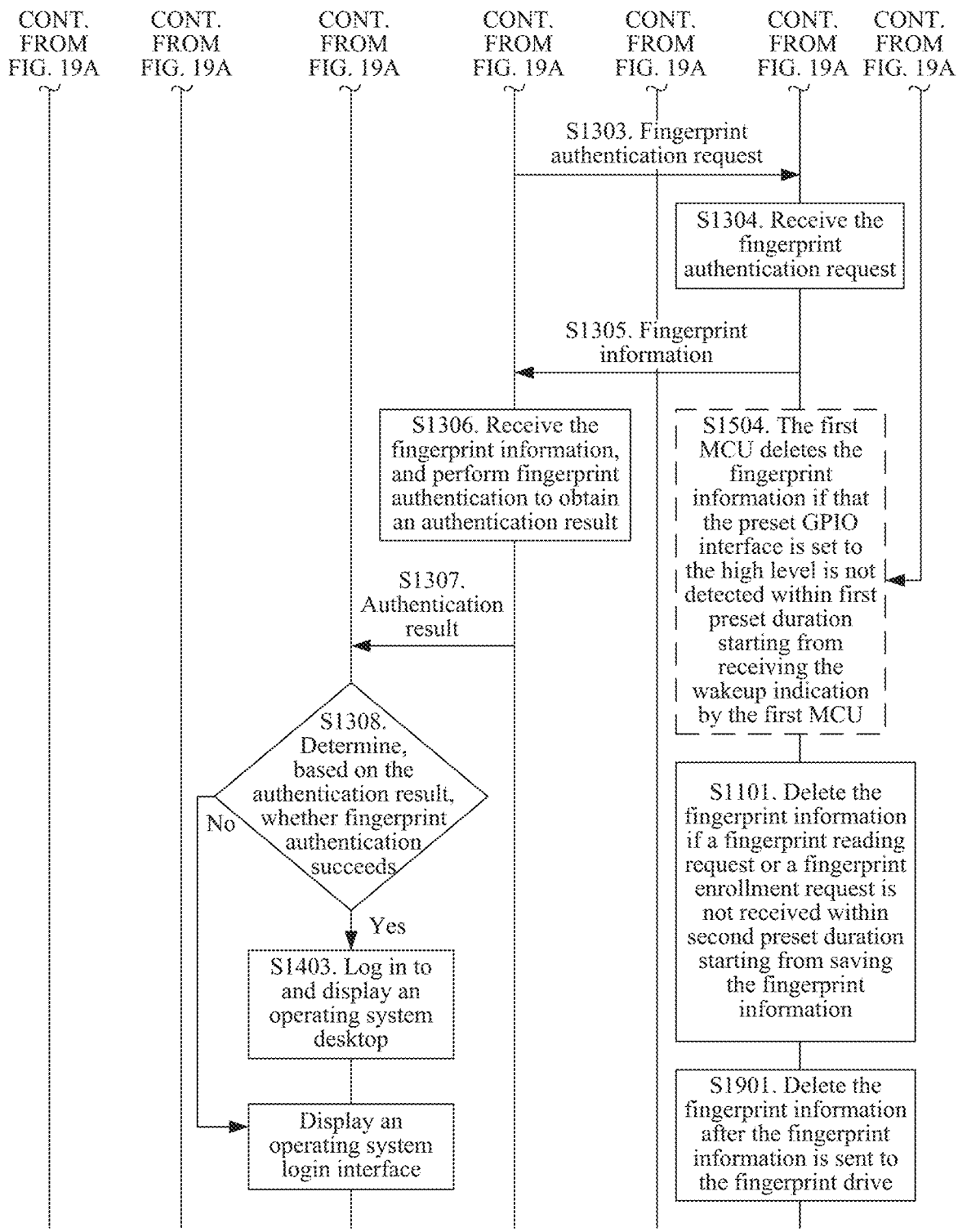

Further, after the first MCU sends the fingerprint information to the fingerprint drive, and the fingerprint drive performs user identity authentication, the first MCU still saves the fingerprint information of the user. To prevent a malicious user from using the fingerprint information to perform user identity authentication and steal information saved in the device, the first MCU can delete the fingerprint information after providing the fingerprint information to the fingerprint drive, so as to prevent reuse of the fingerprint information. Specifically, after S1305, the method in this application may further include S1901. For example, as shown in FIG. 19B, after S1305 shown in FIG. 17B, the method in this application may further include S1901.

S1901. The first MCU deletes the fingerprint information after sending the fingerprint information to the fingerprint drive.

It can be understood that for ease of use, some users may set that the device directly loads an operating system interface without performing user identity authentication after startup. In this case, the fingerprint drive does not need to perform user identity authentication. Specifically, after S505, the method in this application may further include: reading, by the first MCU, login setting information of the device; and deleting, by the first MCU, the fingerprint information if the login setting information of the device indicates that the device does not need to perform user identity authentication after startup.

For example, if the login setting information of the device indicates that the device does not need to perform fingerprint authentication after startup, the first MCU can delete the fingerprint information after third preset duration starting from completing loading of the fingerprint drive by the device elapses.

According to the method for starting up a device provided in this application, user identity authentication can be performed simultaneously when the device starts up, to log in to the operating system of the device. That is, startup and user identity authentication can be implemented by performing a one-button startup operation by the user. This can reduce user operations and duration that are required for device startup and system login, and improve device startup efficiency and system login efficiency. In addition, the fingerprint information can be further deleted in time, to prevent the malicious user from using the fingerprint information to perform user identity authentication.

In a third application scenario of this application, when the device (for example, the notebook computer 100) is in a screen-off state in a sleep mode or a working mode, if the user presses the power button of the device (for example, presses and holds the power button of the device), the user can control the device to shut down. The following of this application describes the method in this application by using an example in which the user presses and holds the power button of the device to control the device to shut down. The press and hold operation herein may mean that a time when the user presses the power button is longer than preset press duration.

Figure 20A:
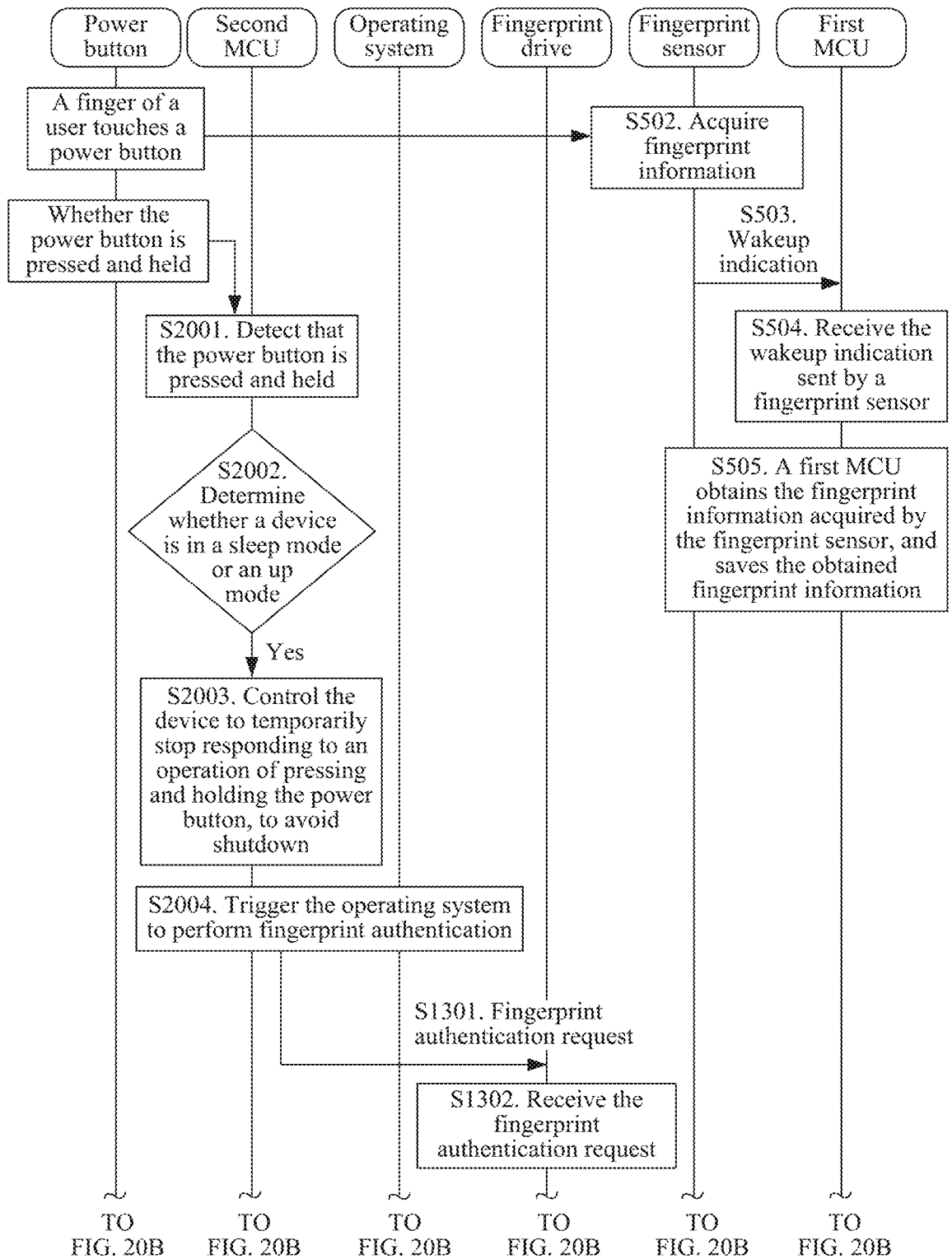
FIG. 20A and FIG. 20B are flowchart 9 of a method for starting up a device according to this application.
Figure 20B:
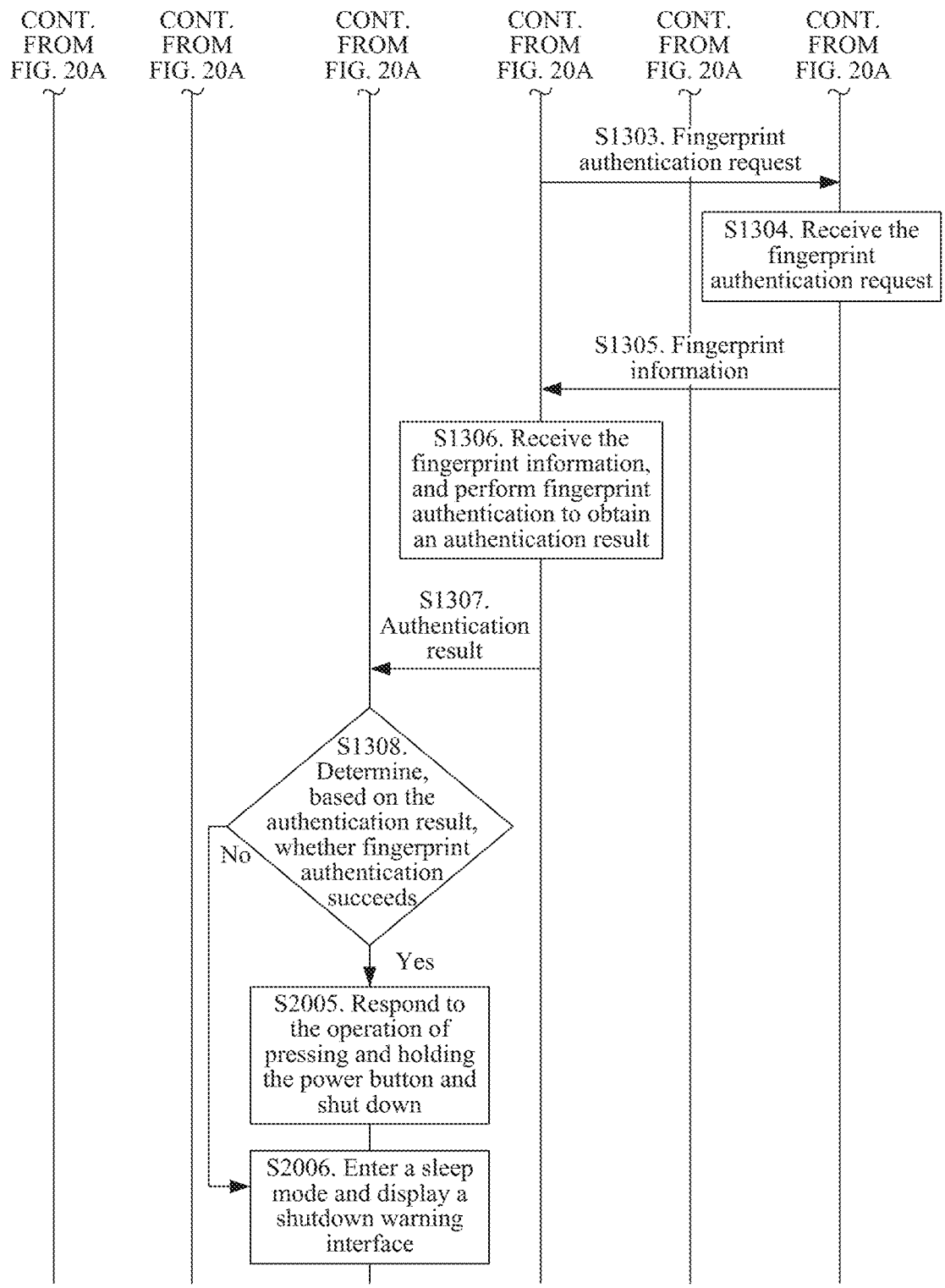

To prevent the device from being shut down by a malicious user pressing the power button of the device and therefore prevent loss of information not saved yet in the device (for example, a document that is being edited and that is not saved in the device) due to forced shutdown of the device, as shown in FIG. 20A, the method in this application may include S2001:

S2001. The second MCU detects that the power button is pressed and held.

S2002. The second MCU determines whether a device is in a sleep mode or an up mode.

Specifically, if the second MCU determines that the device is in the sleep mode or the up mode, the second MCU can continue to perform S2003 and S2004.

S2003. The second MCU controls the device to temporarily stop responding to an operation of pressing and holding the power button to avoid shutdown.

If the user presses and holds the power button, the device can usually respond to the press and hold operation, and is shut down. However, in this application, to avoid that the device shuts down when a malicious user presses and holds the power button, and consequently, information not saved yet in the device is lost due to forced shutdown of the device, the second MCU can control the device to temporarily stop responding to the operation of pressing and holding the power button, then trigger the operating system to perform fingerprint authentication, and after fingerprint authentication succeeds, control the device to respond to the operation of pressing and holding the power button and shut down.

In a process in which the user presses and holds the power button, the fingerprint sensor can acquire the fingerprint information of the user. That is, as shown in FIG. 20A, the method in this application may further include S502 to S505.

S2004. The second MCU triggers the operating system to perform fingerprint authentication.

After S2004, the method in this application may further include S1301 to S1308. After S1308, if the authentication result indicates that fingerprint authentication succeeds, S2005 may continue to be performed; or if the authentication result indicates that fingerprint authentication fails, S2006 may continue to be performed.

S2005. The device responds to the operation of pressing and holding the power button and shuts down.

If the authentication result indicates that fingerprint authentication succeeds, it indicates that the user that presses and holds the power button is an owner of the device, and can control the device to shut down normally.

S2006. The device enters a sleep mode and displays a shutdown warning interface.

If the authentication result indicates that fingerprint authentication fails, it indicates that the user that presses and holds the power button is not an owner of the device, the device can be controlled to enter the sleep mode and display the shutdown warning interface.

Figure 21:
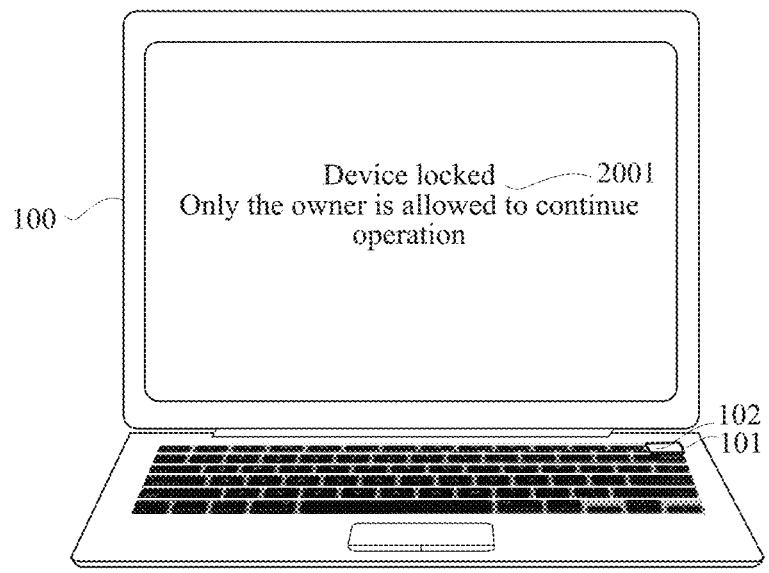
FIG. 21 is schematic diagram 7 of a display interface of a device according to this application.

For example, if the authentication result indicates that fingerprint authentication fails, the device can enter the sleep mode, and display the "shutdown warning interface" shown in FIG. 21. For example, prompt information indicating "Device locked" and "Only the owner is allowed to continue operation" 2001 can be displayed in the "shutdown warning interface" shown in FIG. 21.

Optionally, if the authentication result indicates that fingerprint authentication fails, the device can further send a voice alarm, to warn the malicious user not to operate the device, and remind the owner to stop a malicious shutdown operation of a malicious user on the device in time.

Further, in the third application scenario, the method for starting up a device provided in this application may further include S1101, S1501 to S1504, S1801, or another step, and details are not described in this application again.

According to the method for starting up a device protected by this application, user identity authentication can be performed simultaneously when the device starts up, to log in to the operating system of the device. That is, startup and user identity authentication can be implemented by performing a one-button startup operation by the user. This can reduce user operations and duration that are required for device startup and system login, and improve device startup efficiency and system login efficiency. In addition, the fingerprint information can be further deleted in time, to prevent the malicious user from using the fingerprint information to perform user identity authentication.

In addition, this method can further avoid malicious shutdown performed by a malicious user on device, and loss of information not saved yet on the device.

It can be understood that in this application, another processor may alternatively be used to replace the first MCU or the second MCU to perform a related method process. For example, the another processor may be a CPU of the device, or the another processor may be any processor such as a general purpose processor or a field programmable gate array (Field Programmable Gate Array, FPGA) that can perform the method steps performed by the first MCU or the second MCU and implement "one-button startup and login" of the device. This is not limited in this embodiment of the present invention.

The foregoing mainly describes the solution provided in the embodiments of this application from a perspective of a process in which the user presses the power button of the device to start up the device. It can be understood that, to implement the foregoing functions, the device includes corresponding function modules that perform the functions. A person skilled in the art shall be aware that, with reference to terminals and algorithm steps in the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, division may be performed on the device based on the examples of the method. For example, modules or units may be divided based on corresponding functions, or two or more functions may be integrated into one processing module. The integrated module may be implemented in a form of hardware, or may be implemented in a form of a software module or unit. In this embodiment of this application, module or unit division is an example, and is merely logical function division, or may be other division during actual implementation.

Figure 22:
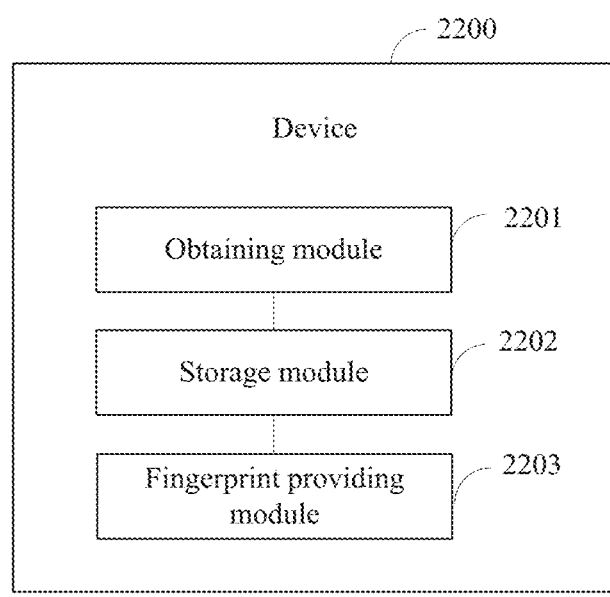
FIG. 22 is schematic structural diagram 1 of a device according to this application.

FIG. 22 is a possible schematic structural diagram of the device in the foregoing embodiments. The device may include a power button and a fingerprint sensor, and the power button is integrated with the fingerprint sensor. As shown in FIG. 22, the device 2200 may include an obtaining module 2201, a storage module 2202, and a fingerprint providing module 2203.

The obtaining module 2201 is configured to support an operation of "obtaining fingerprint information acquired by the fingerprint sensor" in S401 and S505, S504, S608, and S505' in the method embodiment, and/or is used in another process of the technology described in this specification.

The storage module 2202 is configured to support S401, S505, and an operation of "saving the fingerprint information" in S610 in the method embodiments, and/or is used in another process of the technology described in this specifi- The fingerprint providing module 2203 is configured to support S402 in the method embodiment, and/or is used in another process of the technology described in this specification.

Figure 23:
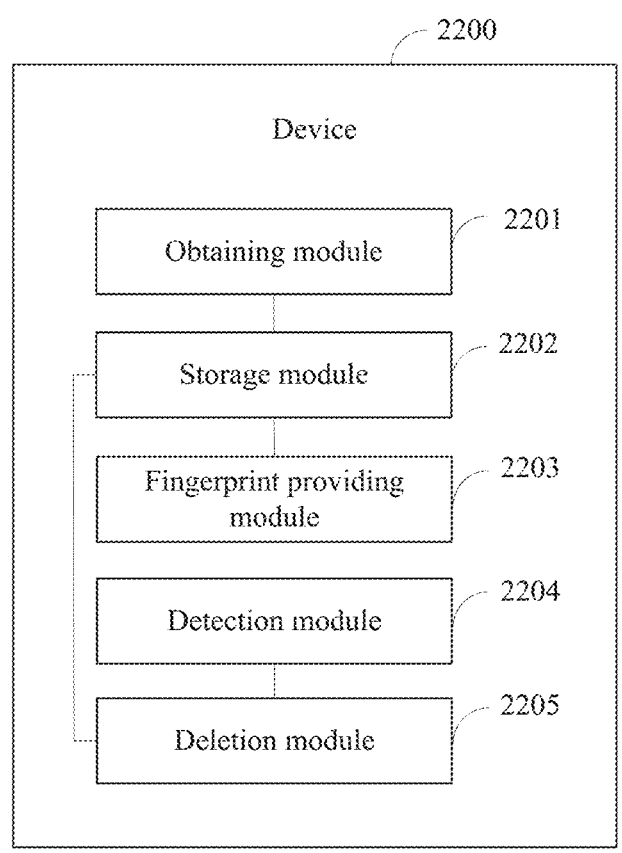
FIG. 23 is schematic structural diagram 2 of a device according to this application.

Further, as shown in FIG. 23, the device 2200 may further include a detection module 2204 and a deletion module 2205. The detection module 2204 is configured to support S1401, S1402, S1502, S2001, and S2002 in the method embodiments, and/or is used in another process of the technology described in this specification. The deletion module 2205 is configured to support S1101, S1504, and S1901 in the method embodiments, and/or is used in another process of the technology described in this specification.

Further, the device 2200 may further include a power-on and initialization module and a login display module. The power-on and initialization module is configured to support S501, S601 to S603, and S603' in the method embodiments, and/or is used in another process of the technology described in this specification. The login display module is configured to support S604, S605, S1403, and S1404 in the method embodiments, and/or is used in another process of the technology described in this specification.

Further, the device may further include function modules configured to support method steps such as S502, S503, S607, S609, S1301 to S1308, S1501, and S1503. The function modules are not described one by one in this application.

Certainly, the device 2200 includes but is not limited to the listed unit modules. For example, the device 2200 may further include a sending module configured to send data or a signal to another device, a receiving module configured to receive data or a signal sent by another device, or another module. In addition, specific functions that can be implemented by the foregoing modules also include but are not limited to functions corresponding to the method steps in the foregoing examples. For detailed descriptions of other units of the device 2200 and the units of the device 2200, refer to detailed descriptions of the corresponding method steps, and details are not described in this embodiment of this application again.

When an integrated unit is used, the obtaining module 2201, the fingerprint providing module 2203, the detection module 2204, the deletion module 2205, and the like may be integrated into one processing unit. The processing unit may be a processor or a controller, for example, a CPU, a general purpose processor, a digital signal processor (Digital Signal Processor, DSP), an application-specific integrated circuit (Application-Specific Integrated Circuit, ASIC), an FPGA, an MCU or another programmable logic device, a transistor logic device, a hardware component, or any combination thereof. The processing unit may implement or execute various example logical blocks, modules, and circuits described with reference to examples described in content disclosed in this application. Alternatively, the processing unit may be a combination of processors implementing a computing function, for example, a combination of one or more microprocessors or a combination of a DSP and a microprocessor. The storage module may be a memory.

Figure 24:
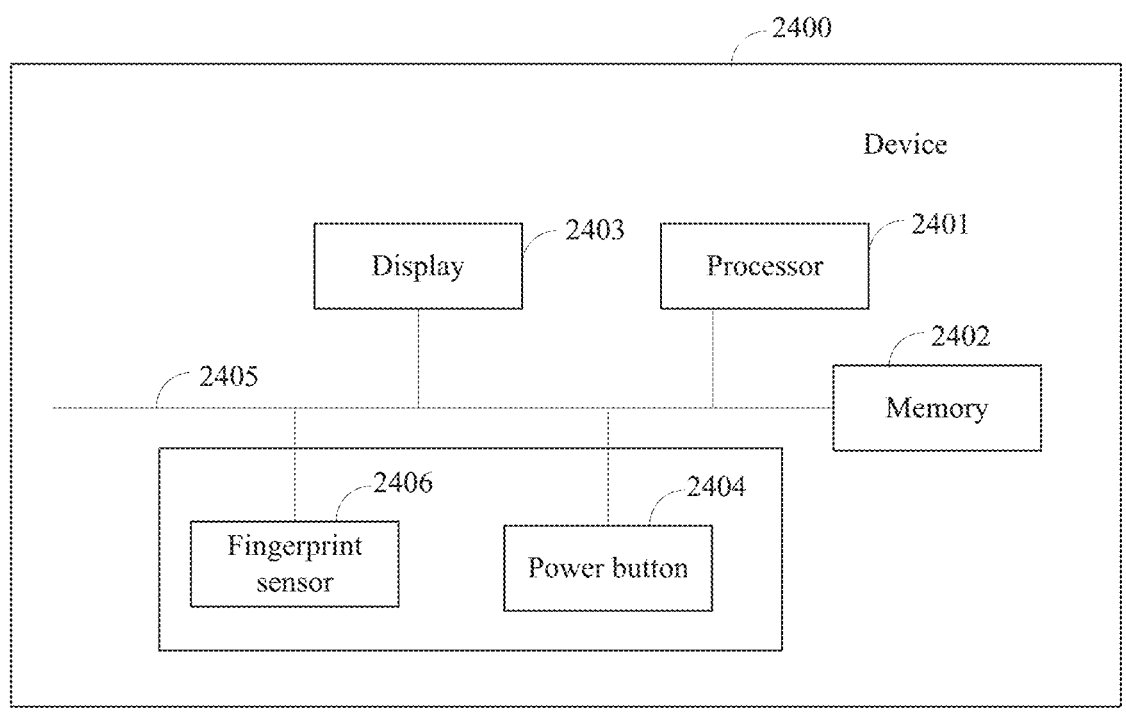
FIG. 24 is schematic structural diagram 3 of a device according to this application.

When the processing unit is a processor, and the storage module is a memory, the device 2200 in this embodiment of this application may be a device 2400 shown in FIG. 24. As shown in FIG. 24, the device 2400 includes a processor 2401, a memory 2402, a display 2403, a power button 2404, a fingerprint sensor 2406, and a bus 2405. The power button 2404 is integrated with the fingerprint sensor 2406, and the processor 2401, the memory 2402, the display 2403, the power button 2404, the fingerprint sensor 2406, and the bus 2405 are interconnected by using the bus 2405. The processor 2401 may include a CPU, a first MCU, and a second MCU of the device 2400.

The fingerprint sensor 2406 is configured to acquire fingerprint information of a user, the memory 2402 is configured to store computer program code, the computer program code includes an instruction, and when the processor 2401 of the device 2400 executes the instruction, the device 2400 performs related method steps in any one of FIG. 4, FIG. 5A, FIG. 5B, FIG. 11A, FIG. 11B, FIG. 13A, FIG. 13B, FIG. 14A, FIG. 14B, FIG. 15A, FIG. 15B, FIG. 17A, FIG. 17B, FIG. 19A, FIG. 19B, FIG. 20A, and FIG. 20B to implement the method for starting up a device in the foregoing embodiments.

The bus 2405 may be a peripheral component interconnect (Peripheral Component Interconnect, PCI) bus, an extended industry standard architecture (Extended Industry Standard Architecture, EISA) bus, or the like. The bus 2405 may be classified into an address bus, a data bus, a control bus, and the like. For ease of representation, only one thick line is used to represent the bus in FIG. 24, but this does not mean that there is only one bus or only one type of bus.

An embodiment of the present invention further provides a computer storage medium. The computer storage medium stores computer program code, and when a processor 2401 of the device 2400 executes the computer program code, the device 2400 performs related method steps in any one of FIG. 5A, FIG. 5B, FIG. 11A, FIG. 11B, FIG. 13A, FIG. 13B, FIG. 14A, FIG. 14B, FIG. 15A, FIG. 15B, FIG. 17A, FIG. 17B, FIG. 19A, FIG. 19B, FIG. 20A, and FIG. 20B, to implement the method for starting up a device in the foregoing embodiments.

Figure 25:
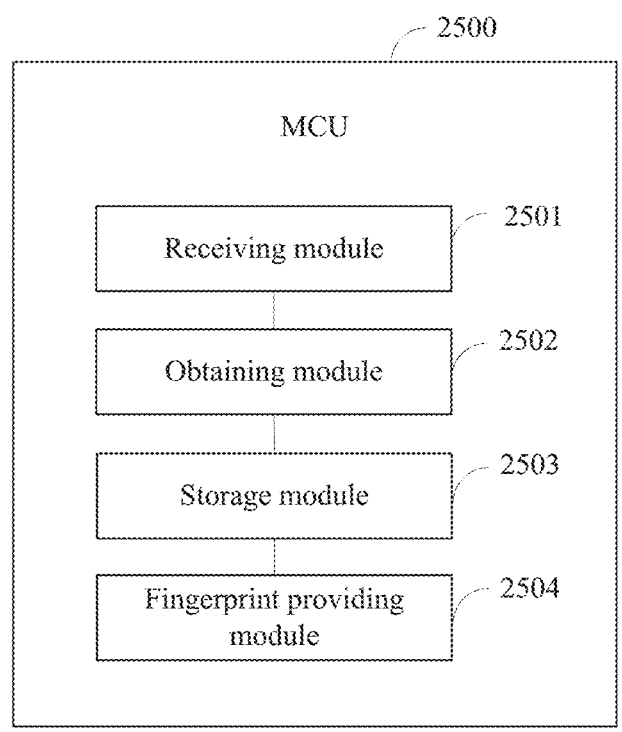
FIG. 25 is schematic structural diagram 1 of an MCU according to this application.

FIG. 25 is a possible schematic structural diagram of the MCU in the foregoing embodiments. The MCU may be included in the foregoing device. The device includes a power button and a fingerprint sensor, and the power button is integrated with the fingerprint sensor. As shown in FIG. 25, the MCU 2500 may include a receiving module 2501, an obtaining module 2502, a storage module 2503, and a fingerprint providing module 2504.

The receiving module 2501 is configured to support S504, S608, and S1304 in the method embodiments, and/or is used in another process of the technology described in this specification. The obtaining module 2502 is configured to support an operation of "obtaining fingerprint information acquired by the fingerprint sensor" in S505 and S505', and/or is used in another process of the technology described in this specification. The storage module 2503 is configured to support an operation of "saving the fingerprint information" in S505 in the method embodiments, and/or is used in another process of the technology described in this specification. The fingerprint providing module 2504 is configured to support S609 and S1305 in the method embodiments, and/or is used in another process of the technology described in this specification.

Figure 26:
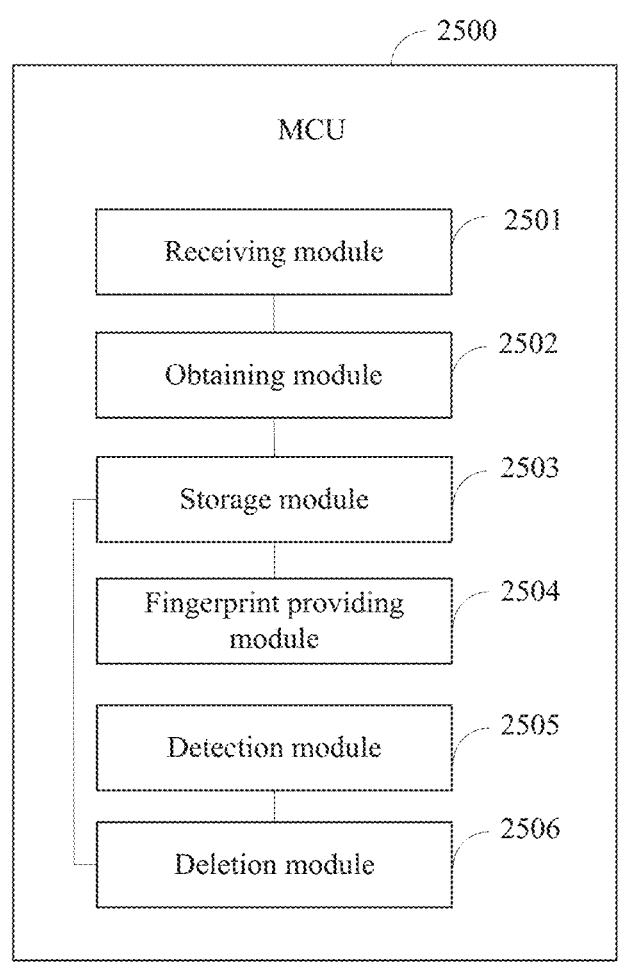
FIG. 26 is schematic structural diagram 2 of an MCU according to this application.

Further, as shown in FIG. 26, the MCU 2500 may further include a detection module 2505 and a deletion module 2506. The detection module 2505 is configured to support S1502 in the method embodiments, and/or is used in another process of the technology described in this specification. The deletion module 2506 is configured to support S1504, S1101, and S1901 in the method embodiments, and/or is used in another process of the technology described in this specification.

Certainly, the MCU 2500 includes but is not limited to the listed unit modules. In addition, specific functions that can be implemented by the foregoing modules also include but are not limited to functions corresponding to the method steps in the foregoing examples. For detailed descriptions of other units of the MCU 2500 and the units of the MCU 2500, refer to detailed descriptions of the corresponding method step, and details are not described in this embodiment of this application again.

Figure 27:
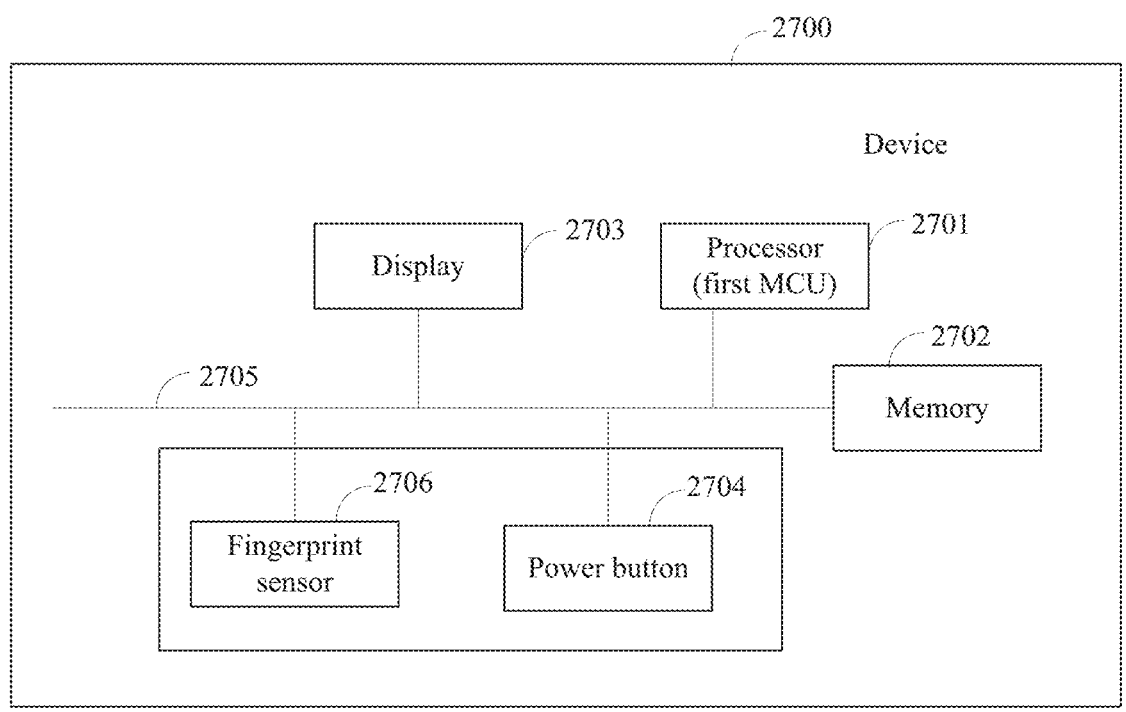
FIG. 27 is schematic structural diagram 4 of a device according to this application.

The MCU 2500 in this embodiment of this application may be included in a device 2700 shown in FIG. 27. As shown in FIG. 27, the device 2700 includes a processor 2701, a memory 2702, a display 2703, a power button 2704, a fingerprint sensor 2706, and a bus 2705. The power button 2704 is integrated with the fingerprint sensor 2706, and the processor 2701, the memory 2702, the display 2703, the power button 2704, the fingerprint sensor 2706, and the bus 2705 are interconnected by using the bus 2705. The processor 2701 may include the first MCU of the device 2700.

The fingerprint sensor 2406 is configured to acquire fingerprint information of a user, the memory 2702 is configured to store computer program code, the computer program code includes an instruction, and when the processor 2701 of the device 2700 executes the instruction, the device 2700 performs related method steps in any one of FIG. 5A, FIG. 5B, FIG. 11A, FIG. 11B, FIG. 13A, FIG. 13B, FIG. 14A, FIG. 14B, FIG. 15A, FIG. 15B, FIG. 17A, FIG. 17B, FIG. 19A, FIG. 19B, FIG. 20A, and FIG. 20B to implement the method for starting up a device in the foregoing embodiments.

The bus 2704 may be a PCI bus, an EISA bus, or the like. The bus 2704 may be classified into an address bus, a data bus, a control bus, and the like. For ease of representation, only one thick line is used to represent the bus in FIG. 27, but this does not mean that there is only one bus or only one type of bus.

An embodiment of the present invention further provides a computer storage medium. The computer storage medium stores computer program code, and when a processor 2701 of a device 2700 executes the computer program code, the device 2700 performs related method steps in any one of FIG. 5A, FIG. 5B, FIG. 11A, FIG. 11B, FIG. 13A, FIG. 13B, FIG. 14A, FIG. 14B, FIG. 15A, FIG. 15B, FIG. 17A, FIG. 17B, FIG. 19A, FIG. 19B, FIG. 20A, and FIG. 20B to implement the method for starting up a device in the foregoing embodiments.

An embodiment of the present invention further provides a computer program product. Running of the computer program product on a computer causes the computer to perform related method steps in any one of FIG. 4, FIG. 5A, FIG. 5B, FIG. 11A, FIG. 11B, FIG. 13A, FIG. 13B, FIG. 14A, FIG. 14B, FIG. 15A, FIG. 15B, FIG. 17A, FIG. 17B, FIG. 19A, FIG. 19B, FIG. 20A, and FIG. 20B to implement the method for starting up a device in the foregoing embodiments.

The device 2200, the device 2400, the MCU 2500, the device 2700, the computer storage medium, and the computer program product provided in the embodiments of the present invention all are configured to perform the corresponding methods provided above. Therefore, for beneficial effects that can be achieved by the devices, the computer storage medium, and the computer program product, refer to beneficial effects in the corresponding methods provided above, and details are not described herein again.

Figure 28:
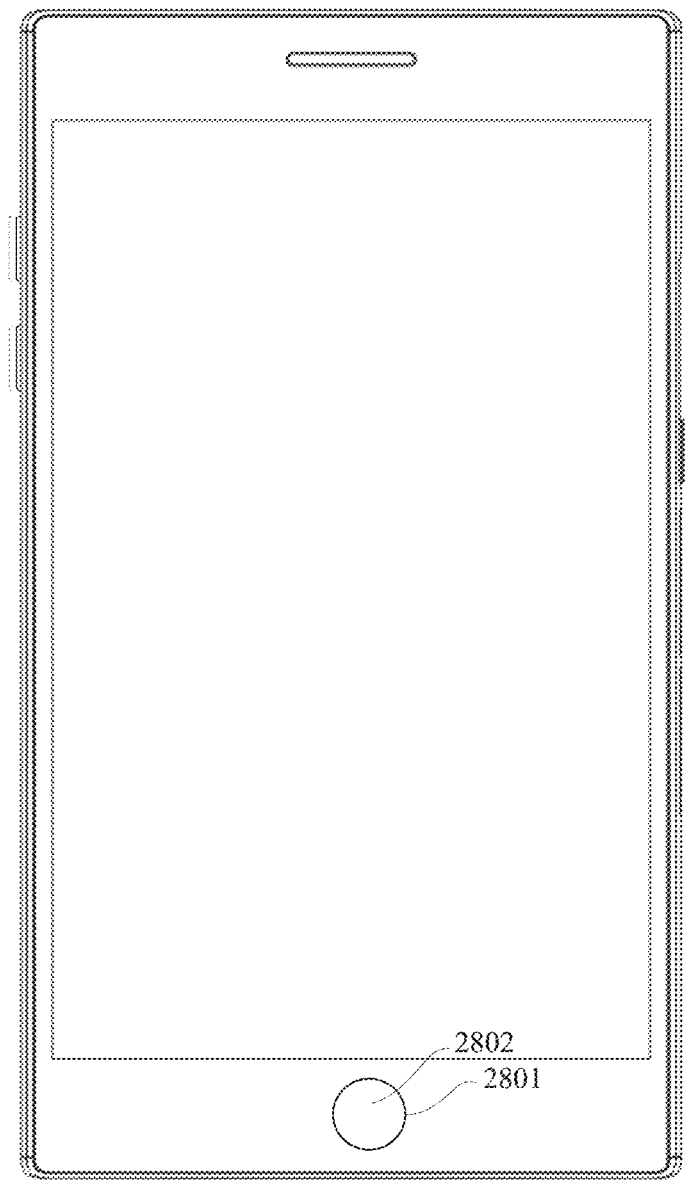
FIG. 28 is a schematic structural diagram of a mobile phone according to this application.

For example, the device provided in this application may alternatively be a mobile phone 2800 shown in FIG. 28. As shown in FIG. 28, the mobile phone 2800 includes a power button 2801 and a fingerprint sensor 2802, and the power button 2801 is integrated with the fingerprint sensor 2802. The power button 2801 of the mobile phone in this application is a physical button in the mobile phone 2800 configured to control the mobile phone 2800 to start up, shut down, and restart.

Although a prior-art mobile phone also includes a power button and a fingerprint sensor, the power button and the fingerprint sensor are usually disposed separately. Therefore, in a startup and unlock process of the mobile phone, a user needs to start the mobile phone by performing a one-button operation, and then enroll fingerprint information by using the fingerprint sensor 202, to perform user identity authentication, unlock the mobile phone, and display an operation desktop.

Figures 29A, 29B:
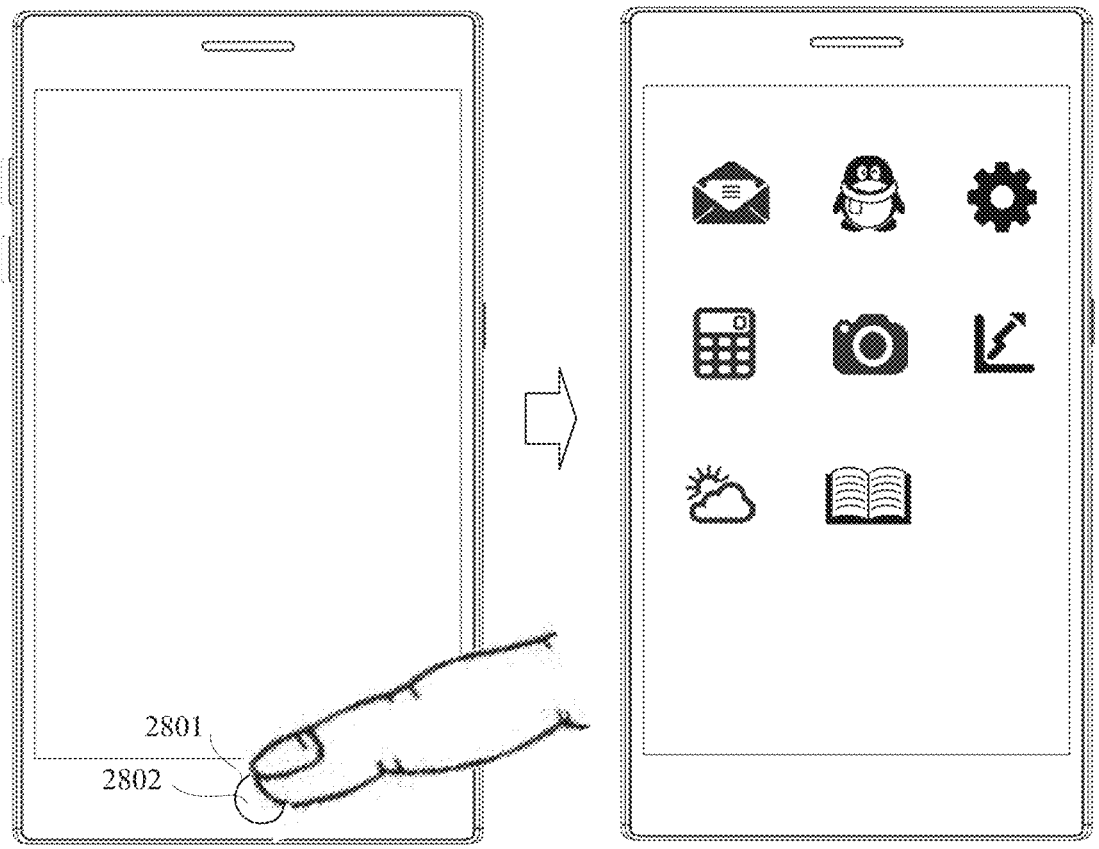
FIG. 29A and FIG. 29B are a schematic diagram of a display interface of a mobile phone according to this application.

For example, assuming that the mobile phone 2800 shown in FIG. 29A is in a down state, as shown in FIG. 29A, when a user presses the power button 2801 of the mobile phone 2800, a finger of the user definitely touches the power button 2801. When the finger of the user touches the power button 2801, the fingerprint sensor 2802 integrated onto the power button 2801 may acquire fingerprint information of the user touching the power button 2801. Therefore, the mobile phone 2800 can respond to a press operation performed by the user on the power button 2801, and start up, and after startup, directly use the fingerprint information acquired by the fingerprint sensor 2802 to perform user identity authentication and unlock the mobile phone, so as to display a mobile phone operation desktop shown in FIG. 29B.

It can be understood that in a startup and unlock process of the mobile phone 2800 shown in FIG. 29A and FIG. 29B, startup and user identity authentication of the mobile phone 2800 can be implemented by performing a one-button startup operation by the user, that is, user identity authentication can be performed simultaneously when the mobile phone 2800 starts up, to unlock the mobile phone 2800. This can reduce duration required for starting up and unlocking the mobile phone 2800, and can improve efficiency of starting up and unlocking the mobile phone 2800.

It should be noted that an example of the mobile phone provided in this application is provided in the manner in FIG. 28 and FIG. 29A, FIG. 29B. The mobile phone provided in this application includes but is not limited to the mobile phone shown in FIG. 28 or FIG. 29A, FIG. 29B, for example, the power button 2801 of the mobile phone provided in this application may alternatively be on a side or the back of the mobile phone 2800.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented depending on a requirement, that is, an inner structure of an apparatus is divided into different function modules to implement all or some of the functions described above. For a specific working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division, or may be other division during actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A method for starting up a device, comprising:
detecting a touch operation from a user on a power button;
obtaining, in response to the touch operation, fingerprint information from a fingerprint sensor integrated with the power button;
saving, by a first microcontroller coupled to the fingerprint sensor, the obtained fingerprint information;
detecting, by the first microcontroller, whether the power button is pressed within a first preset duration, wherein the first preset duration starts when the first microcontroller saves the fingerprint information;
deleting, by the first microcontroller, the saved fingerprint information in response to detecting that the power button is not pressed within the first preset duration;
retaining the saved fingerprint information in response to detecting that the power button is pressed within the first preset duration;
in response to detecting, by a second microcontroller, that the power button is pressed:
triggering power-on a central processing unit (CPU) of the device;
loading a fingerprint drive of the device; and
transmitting a fingerprint authentication request from the fingerprint drive of the device to the first microcontroller; and
when the fingerprint information is retained:
in response to not obtaining, by the first microcontroller, the fingerprint authentication request within a second preset duration, deleting the saved fingerprint information, wherein the second preset duration begins when the fingerprint information is saved; and
in response to obtaining, by the first microcontroller, the fingerprint authentication request within the second preset duration, the method further comprises:
obtaining, by the fingerprint drive, previously enrolled fingerprint information;
receiving, by the fingerprint drive from the first microcontroller, the saved fingerprint information;
performing, by the fingerprint drive, fingerprint authentication on the saved fingerprint information using the enrolled fingerprint information to obtain an authentication result;
obtaining, by an operating system of the device, the authentication result from the fingerprint drive; and
logging the user into the operating system and displaying an operating system desktop when the authentication result indicates that the fingerprint authentication succeeds.

2. The method of claim 1, wherein detecting whether the power button is pressed comprises detecting whether a preset general purpose input/output (GPIO) interface on a mainboard of the device is set to a high level, and wherein when the device is in a sleep mode or a down mode and when the power button is pressed, the preset GPIO interface is set from a low level to the high level.

3. The method of claim 1, wherein the second preset duration is greater than the first preset duration.

4. The method of claim 1, wherein after the fingerprint information is provided to perform the fingerprint authentication, the method further comprises deleting the fingerprint information.

5. The method of claim 1, wherein the method further comprises deleting the fingerprint information after a third duration when a login setting of the device indicates that the device does not need to perform user identity authentication after startup, and wherein the third duration begins when loading the fingerprint drive is completed.

6. The method of claim 1, wherein the first preset duration comprises 1 to 3 seconds.

7. A device, comprising:
a power button;
a fingerprint sensor integrated with the power button;
a first microcontroller coupled to the power button and the fingerprint sensor; and
a memory coupled to the first microcontroller and storing instructions that, when executed by the first microcontroller, cause the first microcontroller to be configured to:
detect a touch operation from a user on the power button;
obtain, in response to the touch operation, fingerprint information from the fingerprint sensor;
save, by the first microcontroller coupled to the fingerprint sensor, the obtained fingerprint information;
detect, by the first microcontroller, whether the power button is pressed within a first preset duration, wherein the first preset duration starts when a microcontroller coupled to the fingerprint sensor saves the fingerprint information;
delete, by the first microcontroller, the saved fingerprint information in response to detecting that the power button is not pressed within the first preset duration;

retain the saved fingerprint information in response to detecting that the power button is pressed within the first preset duration;
in response to detecting, by a second microcontroller, that the power button is pressed:
triggering power-on a central processing unit (CPU) of the device;
loading a fingerprint drive of the device; and
transmitting a fingerprint authentication request from the fingerprint drive of the device to the first microcontroller; and
when the fingerprint information is retained:
in response to not obtaining, by the first microcontroller, the fingerprint authentication request within a second preset duration, deleting the saved fingerprint information, wherein the second preset duration begins when the fingerprint information is saved; and
in response to obtaining, by the first microcontroller, the fingerprint authentication request within the second preset duration, the instructions further cause the first microcontroller to be configured to:
obtain, by the fingerprint drive, previously enrolled fingerprint information;
receive, by the fingerprint drive from the first microcontroller, the saved fingerprint information;
perform, by the fingerprint drive, fingerprint authentication on the saved fingerprint information using the enrolled fingerprint information to obtain an authentication result;
obtain, by an operating system of the device, the authentication result from the fingerprint drive; and
log the user into the operating system and displaying an operating system desktop when the authentication result indicates that fingerprint authentication succeeds.

8. The device of claim 7, wherein to detect whether the power button is pressed, the instructions further cause the first microcontroller to detect a preset general purpose input/output (GPIO) interface on a mainboard of the device is set to a high level.

9. The device of claim 8, wherein when the device is in a sleep mode and when the power button is pressed, the preset GPIO interface is set from a low level to the high level.

10. The device of claim 8, wherein when the device is in a down mode and when the power button is pressed, the preset GPIO interface is set from a low level to the high level.

11. The device of claim 7, wherein the second preset duration is greater than the first preset duration.

12. The device of claim 7, wherein the instructions further cause the first microcontroller to delete the fingerprint information after the fingerprint information is provided to perform the fingerprint authentication.

13. The device of claim 7, wherein the instructions further cause the first microcontroller to delete the fingerprint information after a third duration elapses when a login setting of the device indicates that the device does not need to perform user identity authentication after startup, and wherein the third duration starts when loading the fingerprint drive is complete.

14. The device of claim 7, wherein the first preset duration comprises 1 to 3 seconds.

15. A non-transitory computer-readable storage medium comprising instructions that, when executed by a device, cause the device to:
detect a touch operation from a user on a power button;
obtain, in response to the touch operation, fingerprint information from a fingerprint sensor integrated with the power button;
save, by a first microcontroller coupled to the fingerprint sensor, the obtained fingerprint information;
detect, by the first microcontroller, whether the power button is pressed within a first preset duration, wherein the first preset duration starts when the first microcontroller saves the fingerprint information;
delete, by the first microcontroller, the saved fingerprint information in response to detecting that the power button is not pressed within the first preset duration;
retain the saved fingerprint information in response to detecting that the power button is pressed within the first preset duration;
in response to detecting, by a second microcontroller, that the power button is pressed:
triggering power-on a central processing unit (CPU) of the device;
loading a fingerprint drive of the device; and
transmitting a fingerprint authentication request from the fingerprint drive of the device to the first microcontroller; and
when the fingerprint information is retained:
in response to not obtaining, the first microcontroller, the fingerprint authentication request within a second preset duration, deleting the saved fingerprint information, wherein the second preset duration begins when the fingerprint information is saved; and
in response to obtaining, by the first microcontroller, the fingerprint authentication request within the second preset duration, the instructions further cause the device to:
obtain, by the fingerprint drive, previously enrolled fingerprint information;
receive, by the fingerprint drive from the first microcontroller, the saved fingerprint information;
perform, by the fingerprint drive, fingerprint authentication on the saved fingerprint information using the enrolled fingerprint information to obtain an authentication result;
obtain, by an operating system of the device, the authentication result from the fingerprint drive; and
log the user into the operating system and displaying an operating system desktop when the authentication result indicates that fingerprint authentication succeeds.

16. The non-transitory computer-readable storage medium of claim 15, wherein detecting whether the power button is pressed comprises detecting whether a preset general purpose input/output (GPIO) interface on a mainboard of the device is set to a high level, and wherein when the device is in a sleep mode or a down mode and when the power button is pressed, the preset GPIO interface is set from a low level to the high level.

17. The non-transitory computer-readable storage medium of claim 15, wherein the second preset duration is greater than the first preset duration.

18. The non-transitory computer-readable storage medium of claim 15, wherein after the fingerprint information is provided to perform the fingerprint authentication, the instructions further cause the device to delete the fingerprint information.

19. The non-transitory computer-readable storage medium of claim 15, wherein the instructions further cause the device to delete the fingerprint information after a third duration when a login setting of the device indicates that the device does not need to perform user identity authentication after startup, and wherein the third duration begins when loading the fingerprint drive is completed.

20. The non-transitory computer-readable storage medium of claim 15, wherein the first preset duration comprises 1 to 3 seconds.

\* \* \* \* \*